US012584772B2

(12) United States Patent
Wang et al.

(10) Patent No.: US 12,584,772 B2
(45) Date of Patent: Mar. 24, 2026

(54) METHOD AND SYSTEM FOR MULTIFIELD, MULTIFUNCTIONAL SENSING

(71) Applicant: Northwestern University, Evanston, IL (US)

(72) Inventors: Qian Wang, Evanston, IL (US); Xin Zhang, Chengdu (CN)

(73) Assignee: Northwestern University, Evanston, IL (US)

( * ) Notice: Subject to any disclaimer, the term of this patent is extended or adjusted under 35 U.S.C. 154(b) by 580 days.

(21) Appl. No.: 18/149,879

(22) Filed: Jan. 4, 2023

(65) Prior Publication Data

US 2023/0213365 A1    Jul. 6, 2023

Related U.S. Application Data

(60) Provisional application No. 63/296,558, filed on Jan. 5, 2022.

(51) Int. Cl.
| | |
|---|---|
| *G01D 21/02* | (2006.01) |
| *G01N 9/36* | (2006.01) |
| *G01N 27/02* | (2006.01) |
| *G01N 27/72* | (2006.01) |

(52) U.S. Cl.
CPC .............. *G01D 21/02* (2013.01); *G01N 9/36* (2013.01); *G01N 27/02* (2013.01); *G01N 27/72* (2013.01)

(58) Field of Classification Search
CPC ........ G01D 21/02; G01K 13/00; G01L 1/005; G01L 1/248; G01N 27/02; G01N 27/72; G01N 9/36; G01R 33/12
See application file for complete search history.

(56) References Cited

U.S. PATENT DOCUMENTS 9,154,235 B2 * 10/2015 Scherer .................. H03F 3/082
10,734,829 B2 * 8/2020 Yajima .................. F28D 20/028

OTHER PUBLICATIONS

X. Zhang et al., "A multi-field coupled mechanical-electric-magnetic-chemical-thermal (MEMCT) theory for material systems," *Computer Methods in Applied Mechanics and Engineering* 341 (2018) 133-162.
X. Zhang et al., "Pressure-driven interface evolution in solid-state lithium metal batteries," *Cell Reports Physical Science* 1(2) (2020) 100012.
Huajian Gao et al., "Elastic contact versus indentation modeling of multi-layered materials," *International Journal of Solids and Structures* 29(20) (1992) 2471-2492.
C. Yu et al., "Analytical frequency response functions for contact of multilayered materials," *Mechanics of Materials* 76 (2014) 102-120.
Xin Zhang et al., "Transient and steady-state viscoelastic contact responses of layer-substrate systems with interfacial imperfections," *Journal of the Mechanics and Physics of Solids* 145 (2020) 104170.

* cited by examiner

*Primary Examiner* — Kristina M Deherrera
*Assistant Examiner* — Gedeon M Kidanu
(74) *Attorney, Agent, or Firm* — Bell & Manning, LLC

(57) ABSTRACT

A sensing system includes a sensor mounted on a surface that is subjected to a load. The sensor is configured to detect a first field value related to the surface. A memory is configured to store information regarding the surface. A processor is coupled to the memory and in communication with the sensor. The processor is configured to determine a second field value based on the detected first field value and the information regarding the surface.

20 Claims, 13 Drawing Sheets

Fig. 3

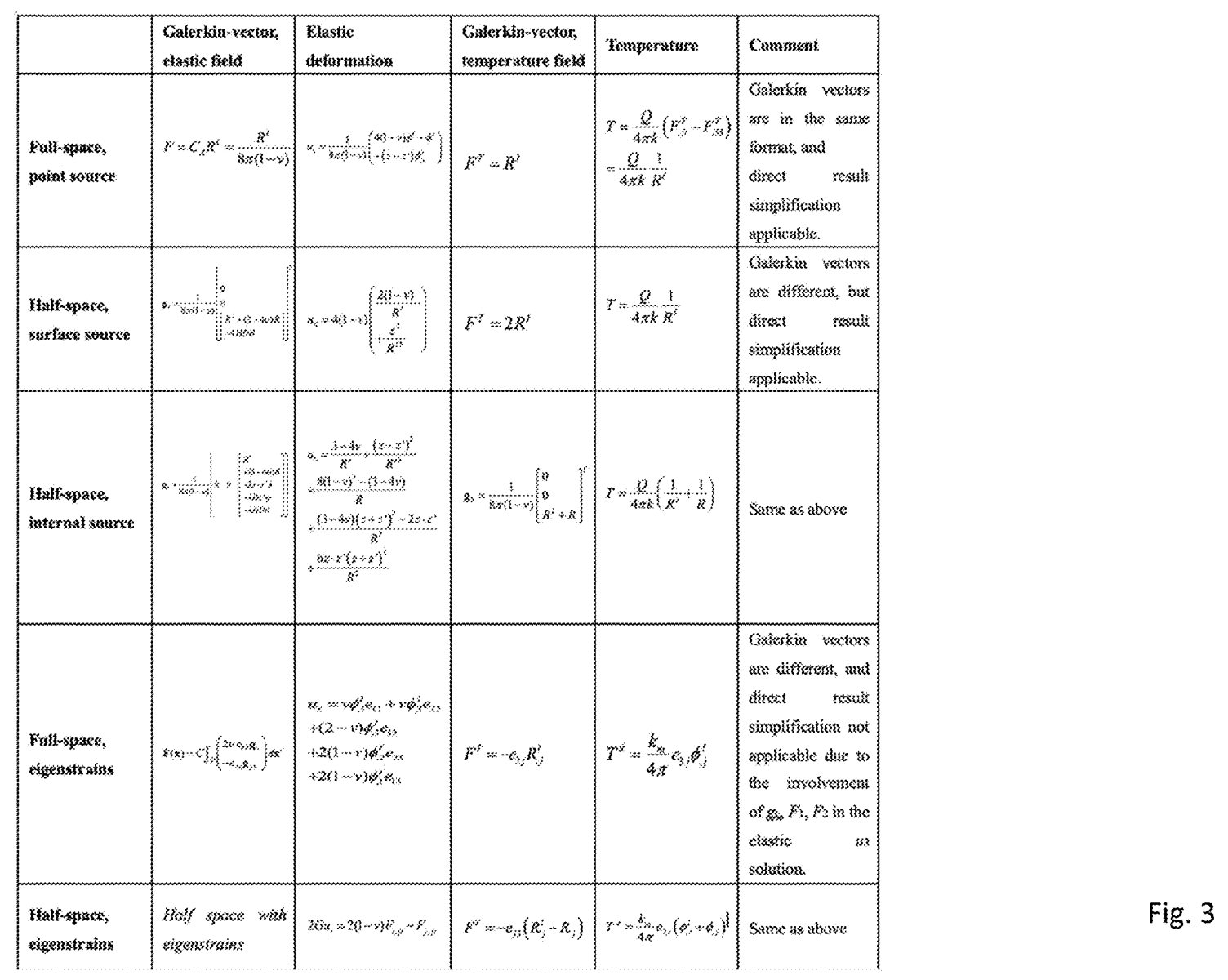

| | Galerkin-vector, elastic field | Elastic deformation | Galerkin-vector, temperature field | Temperature | Comment |
|---|---|---|---|---|---|
| Full-space, point source | $F = C_1 R^i = \dfrac{R^i}{8\pi k(1-\nu)}$ | | $F^T \propto R^i$ | $T = \dfrac{Q}{4\pi k}(F^e_{,ij} - F^e_{,jj})$ $= \dfrac{Q}{4\pi k}\dfrac{1}{R^i}$ | Galerkin vectors are in the same format, and direct result simplification applicable. |
| Half-space, surface source | | | $F^T = 2R^i$ | $T = \dfrac{Q}{4\pi k}\dfrac{1}{R^i}$ | Galerkin vectors are different, but direct result simplification applicable. |
| Half-space, internal source | | | | $T = \dfrac{Q}{4\pi k}\left(\dfrac{1}{R^i} - \dfrac{1}{R^i}\right)$ | Same as above |
| Full-space, eigenstrains | | | $F^T = -e_{ij}R^i_{,j}$ | $T^i = \dfrac{k_{ij}}{4\pi}e_{,j}\theta^i_{,j}$ | Galerkin vectors are different, and direct result simplification not applicable due to the involvement of $g_0, F_1, F_2$ in the elastic solution. |
| Half-space, eigenstrains | *Half space with eigenstrains* | | $F^T = -e_{ij}\left(R^i_{,j} - R^i_{,j}\right)$ | $T^i = \dfrac{k_{ij}}{4\pi}e_{,j}\left(\theta^i_{,j} - \theta^i_{,j}\right)$ | Same as above |

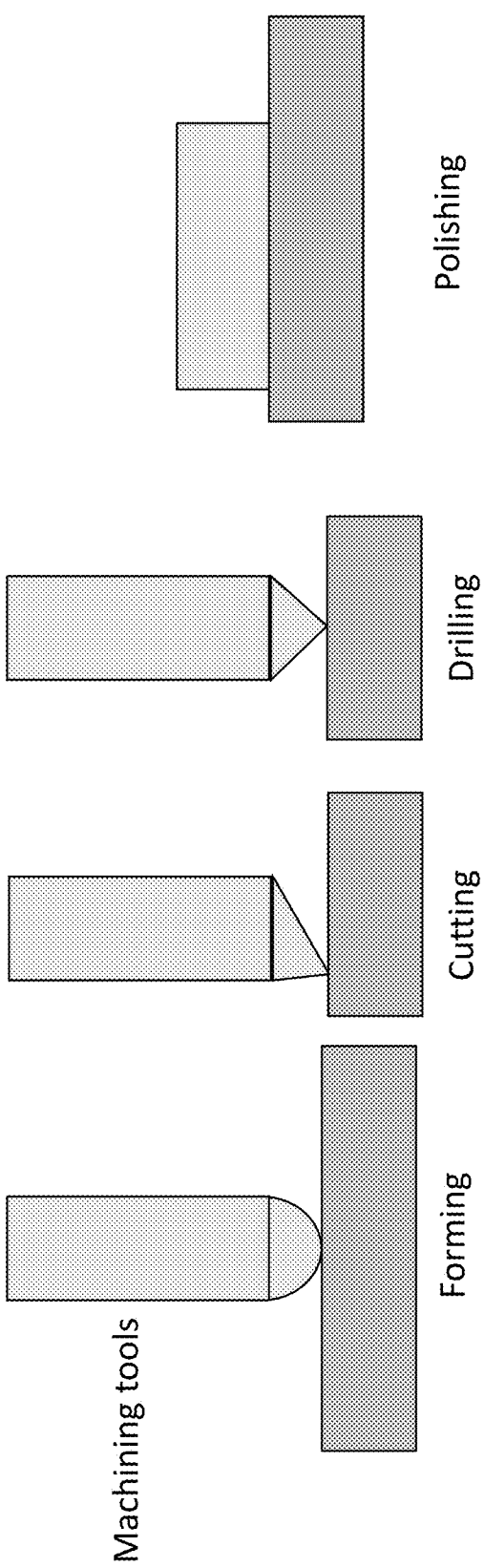
Fig. 7

METHOD AND SYSTEM FOR MULTIFIELD, MULTIFUNCTIONAL SENSING

CROSS-REFERENCE TO RELATED APPLICATION

The present application claims the priority benefit of U.S. Provisional Patent App. No. 63/296,558 filed on Jan. 5, 2022, the entire disclosure of which is incorporated herein by reference.

BACKGROUND

In nature, the macroscopic energy of a material system is commonly in the forms of mechanical, thermal, electromagnetic, and chemical (MEMCT) energies. Therefore, many research efforts have mainly been focused on basic issues of individual mechanical, thermal, electromagnetic, or chemical fields. Recently, problems of multidisciplinary and multifield features have drawn increasingly strong attention.

SUMMARY

An illustrative system includes a sensor mounted on or proximate to a surface that is subjected to a load. The sensor is configured to detect a first field value related to the surface. A memory is configured to store information regarding the surface. A processor is coupled to the memory and in communication with the sensor. The processor is configured to determine a second field value, or additional field values, based on the detected first field value and the information regarding the surface.

In one embodiment, the sensor is a thermal couple or infrared detector such that the first field value comprises a temperature of the surface. The second field value can be electric field potential of the surface or magnetic field potential of the surface, and the processor can determine the electric field potential of the surface or magnetic field potential based at least in part on the temperature. The second field value can also be an amount of displacement of the surface, and the processor can determine the amount of displacement of the surface based at least in part on the temperature. The second field value can also be diffused mass density across the surface, and the processor can determine the diffused mass density of the surface based at least in part on the temperature. In addition, the first field value can be any of the MEMCT fields (e.g., mechanical, thermal, electromagnetic, or chemical), such that any of the other MEMCT fields become the second field. For example, the first field can be displacement detected by an optical sensor, capacitance sensor, etc.

In an illustrative embodiment, the information regarding the surface includes one or more of an elastic modulus of the surface, thermal conductivity of the surface, dielectric permittivity of the surface, magnetic permeability of the surface, and chemical diffusivity of the surface. In another embodiment, the sensor comprises a first sensor in the form of a temperature sensor, and the system also includes a second sensor in the form of a displacement sensor. In such an embodiment, the processor uses measurements from the displacement sensor to adjust a heat-flux coefficient of the surface, and the processor determines the second field value based in part on the adjusted heat-flux coefficient.

In another embodiment, the sensor is located at a distance X from a center of the load that is applied to the surface, and the distance X is less than or equal to ten times a radius of load distribution of the load applied to the surface. In one embodiment, the processor determines the shape of a load distribution of the load, and the processor determines a shape of a heat flux of the surface. The processor compares the shape of the load distribution of the load to the shape of the heat flux, and, responsive to a determination that the shape of the load distribution and the shape of the heat flux are the same, the processor adjusts a heat-flux coefficient for the surface. In another embodiment, the sensor is located at a first location on the surface, and the processor determines one or more field values at a second location on the surface based on a symmetry of the load.

An illustrative method of performing multifield, multifunctional sensing includes sensing, by a sensor mounted on a surface that is subjected to a load, a first field value related to the surface. The method includes storing, in a memory, information regarding the surface. The method also includes determining, by a processor coupled to the memory and in communication with the sensor, a second field value based on the detected first field value and the information regarding the surface.

In one embodiment, the sensor comprises a first sensor in the form of a temperature sensor, and the method further includes sensing, by a second sensor in the form of a displacement sensor, a displacement of the surface in response to the load. The method can also include adjusting, by the processor, a heat-flux coefficient of the surface based at least in part on the sensed displacement of the surface. In such an embodiment, the processor can determine the second field value based in part on the adjusted heat-flux coefficient. In another embodiment, the sensor comprises a temperature sensor that detects a temperature of the surface, and the second field value comprises electric field potential of the surface, magnetic field potential of the surface, an amount of displacement of the surface, or a diffused mass density of the surface. In such an embodiment, the processor determines the second field value based at least in part on the temperature. In another embodiment, the sensor is located at a first location on the surface, and the method further includes determining, by the processor, one or more field values at a second location on the surface based on a symmetry of the load.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3 is a table that summarizes the Galerkin vectors for elastic and temperature problems in accordance with an illustrative embodiment.

as well as the interfacial temperature difference, with thermal conductance $r_t$=100 W/mm$^2$·K, for the problem of a uniform surface heat input of density 2000 W/mm$^2$ on region $\sqrt{x^2+y^2}$≤1.0 mm in accordance with an illustrative embodiment

as well as the interfacial electric potential difference, solved by using the current equivalence method, with electric capacitor parameter $r_e$=1.5×10$^{-2}$C$^2$/Nmm$^3$, for the problem of a uniform surface electric flux of density 2×10$^{-2}$C/mm$^2$ on region $\sqrt{x^2+y^2}$ ≤1.0 mm in accordance with an illustrative embodiment.

Figure 6B:
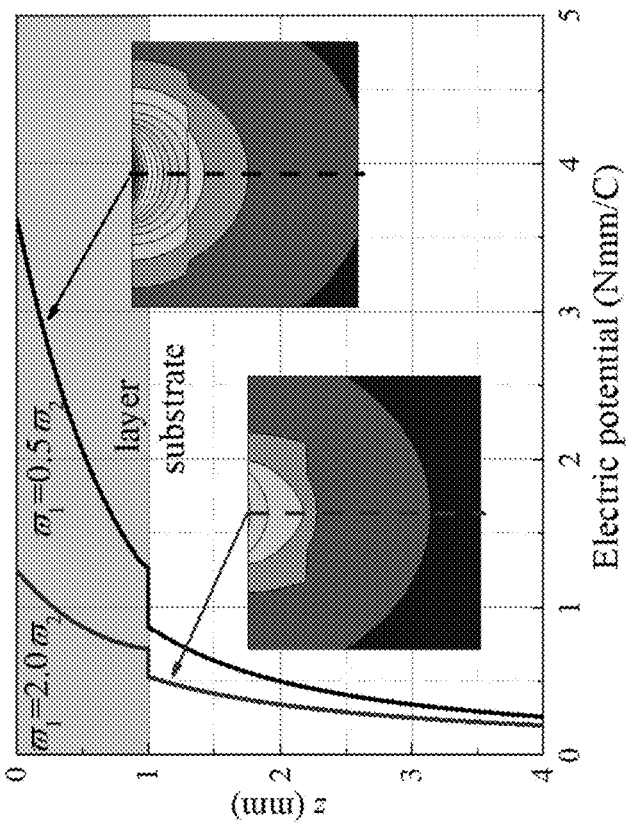
FIG. 6A is a plot of the interfacial electric flux $$D_3^I(x, y, h),$$

FIG. 6B shows the subsurface electric potential distributions along the z direction for dielectric permittivities of $\overline{\omega}_1$=0.5$\overline{\omega}_2$ and 2.0$\overline{\omega}_2$ in accordance with an illustrative embodiment.

FIG. 7 depicts various machining tools that can be used in conjunction with multifield, multifunctional sensors in accordance with an illustrative embodiment.

Figure 8:
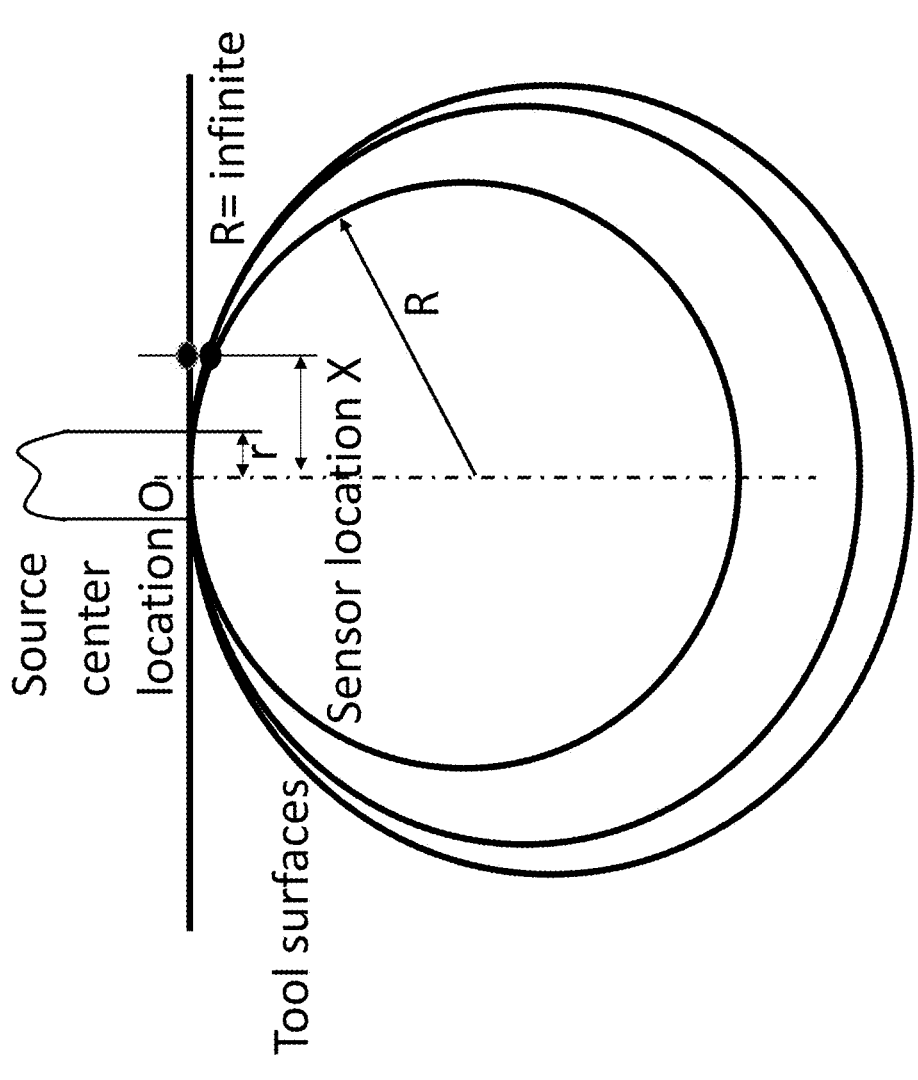

FIG. 8 depicts load distribution on tools surfaces in accordance with an illustrative embodiment.

Figure 9:
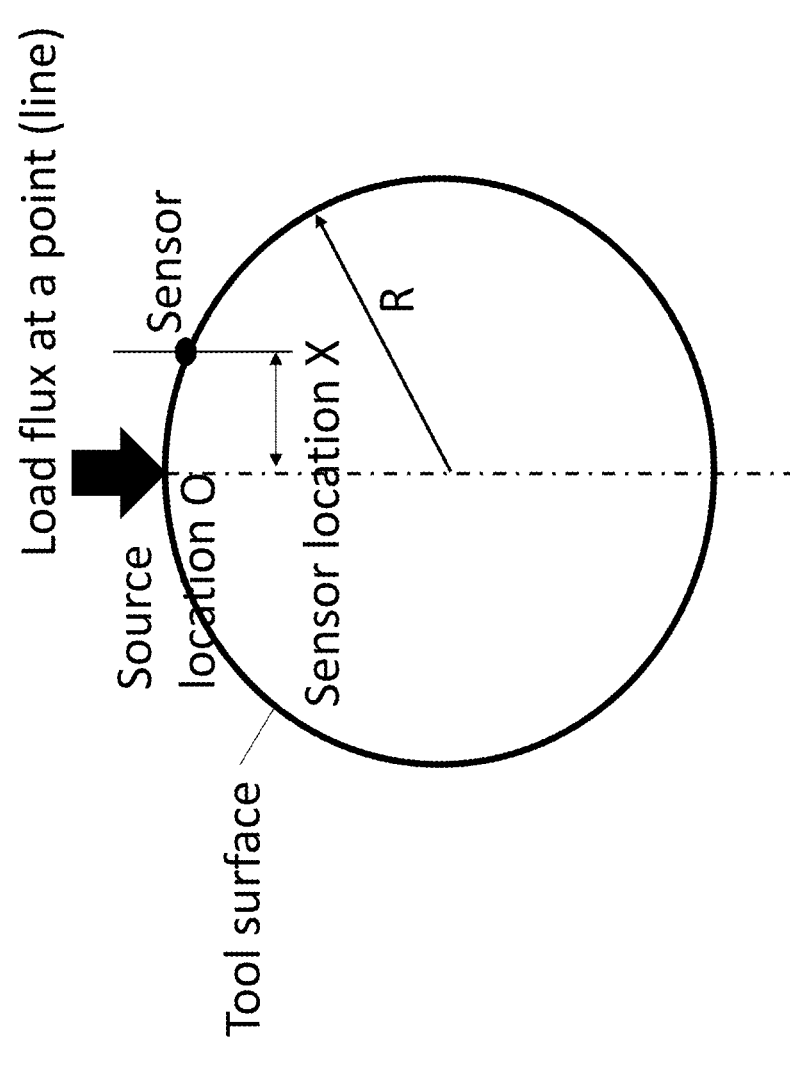

FIG. 9 depicts sensor location relative to a tool surface in accordance with an illustrative embodiment.

Figure 10:
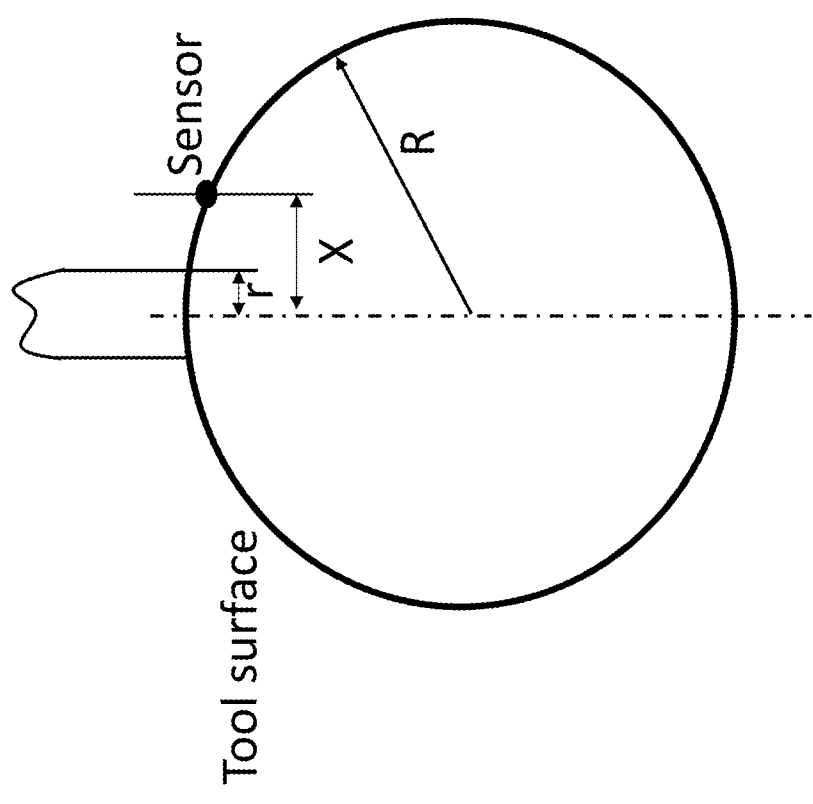

FIG. 10 depicts load distribution of a tool in contact with a known material in accordance with an illustrative embodiment.

Figure 11:
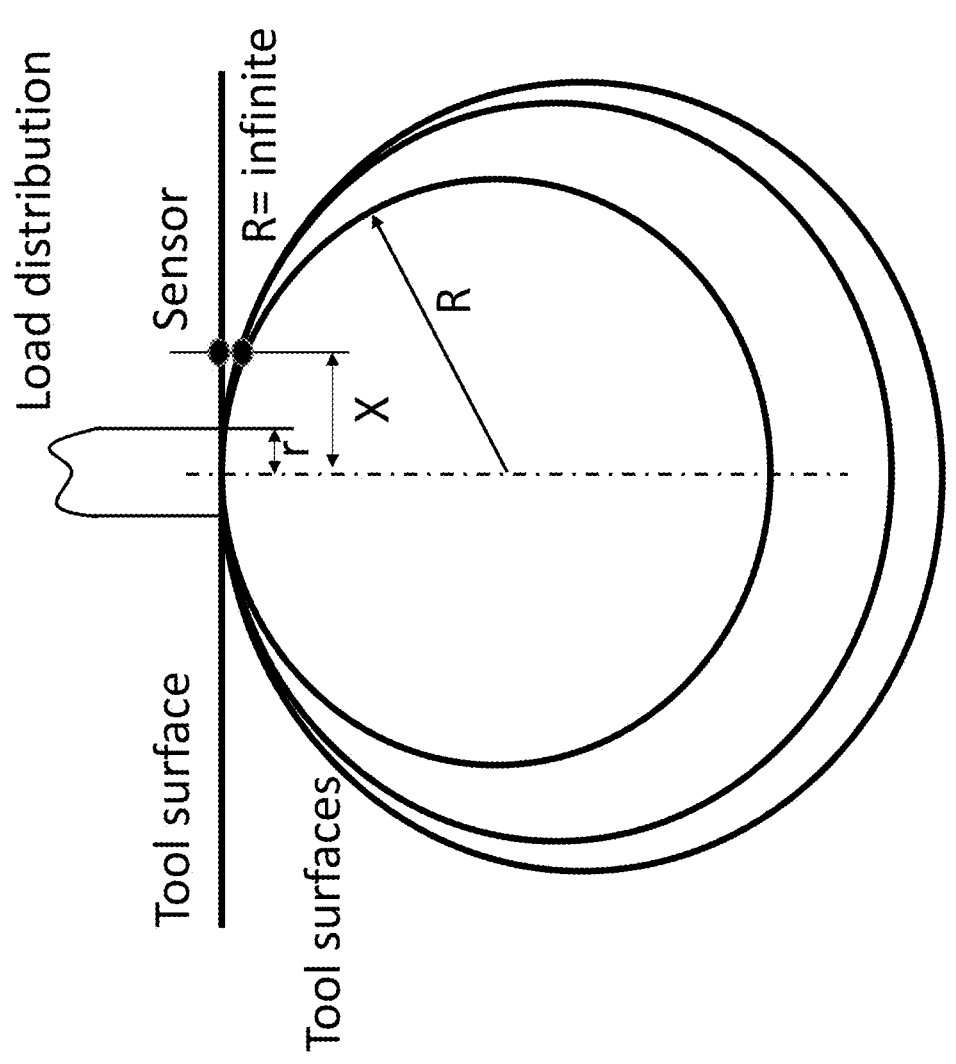

FIG. 11 depicts load distribution and tool surfaces of different radii of curvature R in accordance with an illustrative embodiment.

Figure 12:
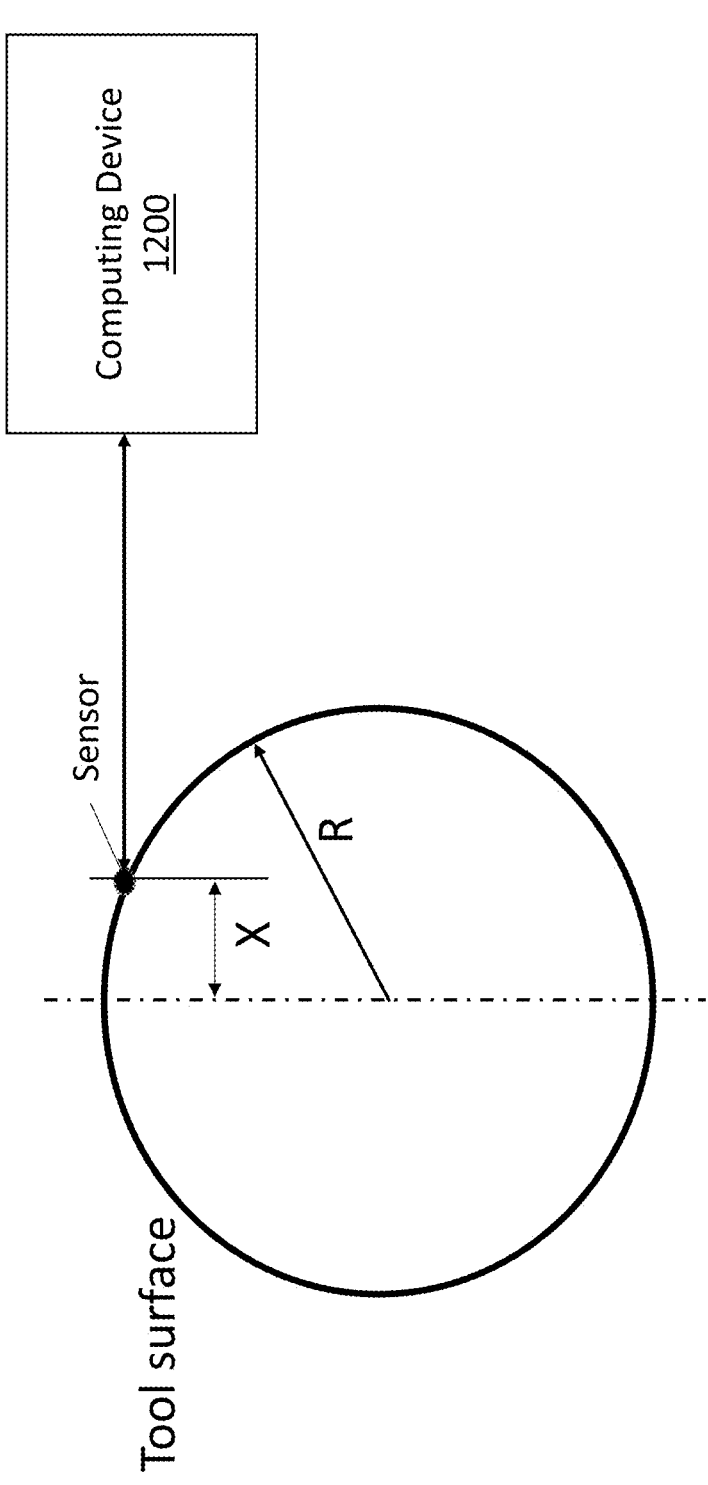

FIG. 12 depicts a sensing system in accordance with an illustrative embodiment.

Figure 13:
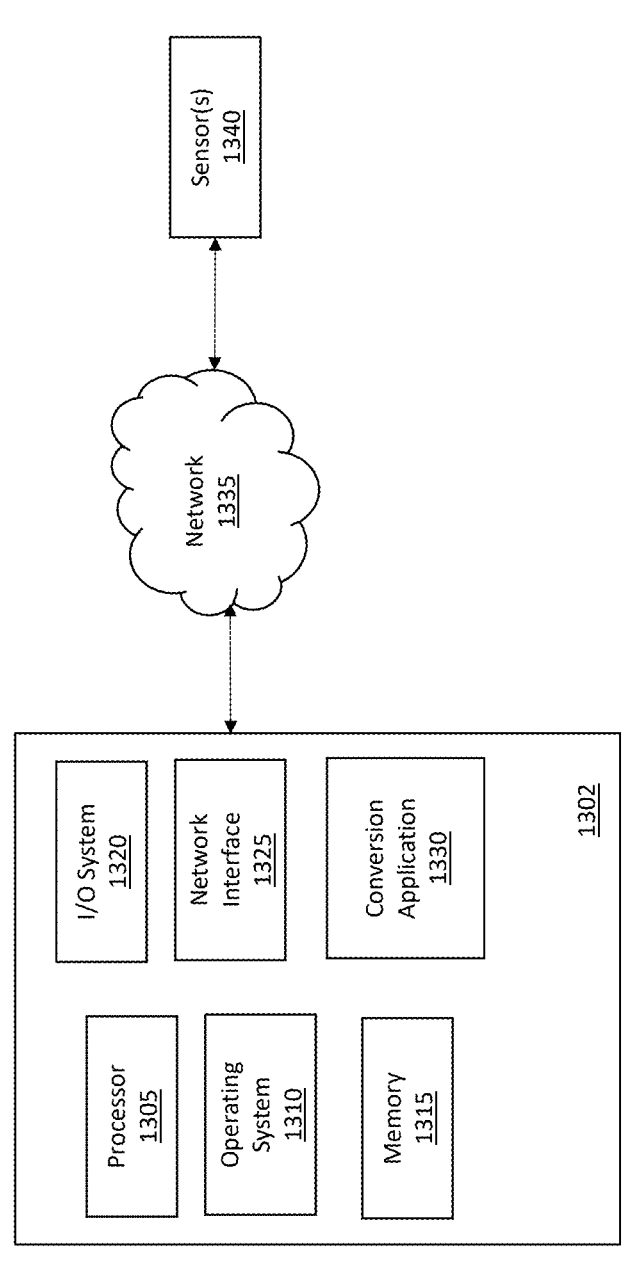

FIG. 13 depicts a sensing system for performing multifield, multifunctional sensing in accordance with an illustrative embodiment.

DETAILED DESCRIPTION

In many cases of technology developments, the mechanical effects, such as contact of various material systems, have been studied in great detail. For example, indentation mechanics of layered and functionally graded materials have been studied using analytical or numerical methods, micromechanics of materials involving inhomogeneities or inclusions have been studied by the phase-field model or the equivalent inclusion method, and nanomechanics of thin films and nano/micro structures have been studied by the theories of strain gradient plasticity or couple stress elasticity. In heat transfer, a great deal of work has been focused on capturing the thermal behaviors of different material systems, among them are the development of the theories of heat transfer and the studies of heat conduction in layered and functionally graded materials, as well as in materials involving inhomogeneities or inclusions. Likewise, the Maxwell equations describe how the electric and magnetic fields are generated and mutually influenced. On the interaction of materials, researchers have developed a mathematical framework to describe the mixture behaviors of material systems with diffusion, known as the mixture theory.

Similarities in some aspects of mechanical, thermal, electromagnetic, and chemical fields have been used for dimension analyses in surface/interfacial mechanics, nano/mesoscopic mechanics, and continuum mechanics. The concept analogy across mechanical field, thermal, and electric/magnetic fields can be dated back to how the related theories were developed, from Einstein who imagined a flow of electric charge or heat in analogy to a mechanical force, from Fourier's law for heat conduction and Ohm's law for electricity, etc. Based on the concept analogy, for example, between heat flow and mass diffusion, the solution methods used in the thermal or thermomechanical solutions have been applied to analyze diffusion, poroelastic, or chemo-mechanical problems. These methods include the numerical manifold method for transient moisture diffusion in graded materials in analogy to the corresponding transient thermal analysis, the equivalent inclusion method for frictional heating in inhomogeneous half-spaces in analogy to the corresponding inclusion problem in elasticity, the unified solution approach for poroelasticity and thermoelasticity, the prediction method for the conversion between the thermal-energy flow and mass transport, the analogy between shear stress in twisted bar and soap film, and the analogy on material properties among electric, elastic, and piezoelectric parameters. These investigations have intensively explored different facets of the MEMCT fields by analogies of their concepts and solution methods, but still involve resolving and re-deriving the field equations of the material systems under consideration.

Long-time mechanics research has resulted in rich theories and solutions for wide ranges of material structures and systems (e.g. layered materials, functionally graded materials, composite materials, etc.). Described herein is a methodology for multi-theory analogy across the MEMCT fields for wide ranges of material systems including full-space, half-space, and layered materials loaded by surface or internal sources, and with or without eigenstrains. The methodology and solution framework are based on the concept analogy and similarities of a number of MEMCT field variables, governing equations, and their own material properties, which can help utilizing existing mechanics results to solve other complicated problems. The proposed MEMCT analogy methodology expands the electromagnetic-elastic analogy theory and adds to previous MEMCT coupling theory for better understanding of multi-field interactions, actions, and conversions.

More specifically, described herein is a unified computation methodology, together with a concept of multifield, multifunctional sensing, from elasticity to electromagnetic-chemical-thermal fields based on the similarities of mechanical-electromagnetic-chemical-thermal (MEMCT) field variables, governing equations, and the material properties pertaining to each individual field. Due to similarity, a number of thermal, electromagnetic, or chemical solutions can be obtained from the direct degradation of existing mechanical solutions by making specified equivalences of $2G \leftrightarrow k_0 \leftrightarrow \overline{\omega}_0 \leftrightarrow \mu_0 \leftrightarrow \beta_0$ with G for shear modulus, $k_0$ for heat conductivity, $\overline{\omega}_0$ for dielectric permittivity, $\mu_0$ for magnetic permeability, and $\beta_0$ for chemical diffusivity, as well as setting Poisson's ratio $\nu=0.5$. These specified equivalences enable quick solutions to other fields directly from mechanical formulations and field coupling directly from analogy, for both the elastic solutions in the forms of Galerkin vectors and Papkovich-Neuber potentials. An example is analyzed to demonstrate that the field solutions of a layered half-space with imperfect thermal, electromagnetic, or chemical interfaces can be directly obtained from the elastic solutions involving interfacial imperfections via the obtained equivalence approach.

The description below includes various formulas and equations that are used to explain the proposed system. The following nomenclature is used for the variables in these equations and formulas. Specifically, $B_i$ is magnetic induction vector, $c_{ijkl}$ is elastic tensor, $C_M$ is generalized material property, $C_M = (c_{ijkl} \leftrightarrow k_{ij} \leftrightarrow \overline{\omega}_{ij} \leftrightarrow \mu_{ij} \leftrightarrow f_{ij})$, $C_p$ is specific heat capacity, $D_i$ is electric displacement vector, E is Young's modulus, $E_i$ is electric field strength, $f_i$ is body force component, $F_i$ is generalized volumetric source, $F_i = (f_i \leftrightarrow q_0 \leftrightarrow \rho_f \leftrightarrow 0 \leftrightarrow W_0)$, $$\overset{\approx (T)}{F}_r$$

is frequency response functions for T, $$\overset{\approx (u_z)}{F}_r$$

is frequency response functions for $u_z$, h is layer thickness, $H_i$ is magnetic field strength, $i_e$ is surface electrical flux, $i_m$ is surface magnetic flux, $J_f$ is current density, $k_{ij}$ is heat conductivity tensor, m, n are Fourier-transformed variables with respect to x, y directions, N is mass concentration, $\overline{p}$ is surface normal force, P is surface point load, $q_0$ is strength of volumetric heat source, $q_i$ is heat flux, $\overline{q}$ is surface heat flux, Q is surface point heat source, $r_c$ is transmission parameter, $r_e$ is electric capacitor parameter, $r_m$ is magnetic inductor parameter, $r_t$ is thermal conductance, t is time, T is temperature rise, $u_i$ is displacement vector, and $W_0$ is intensity of local mass source.

Figure 1:
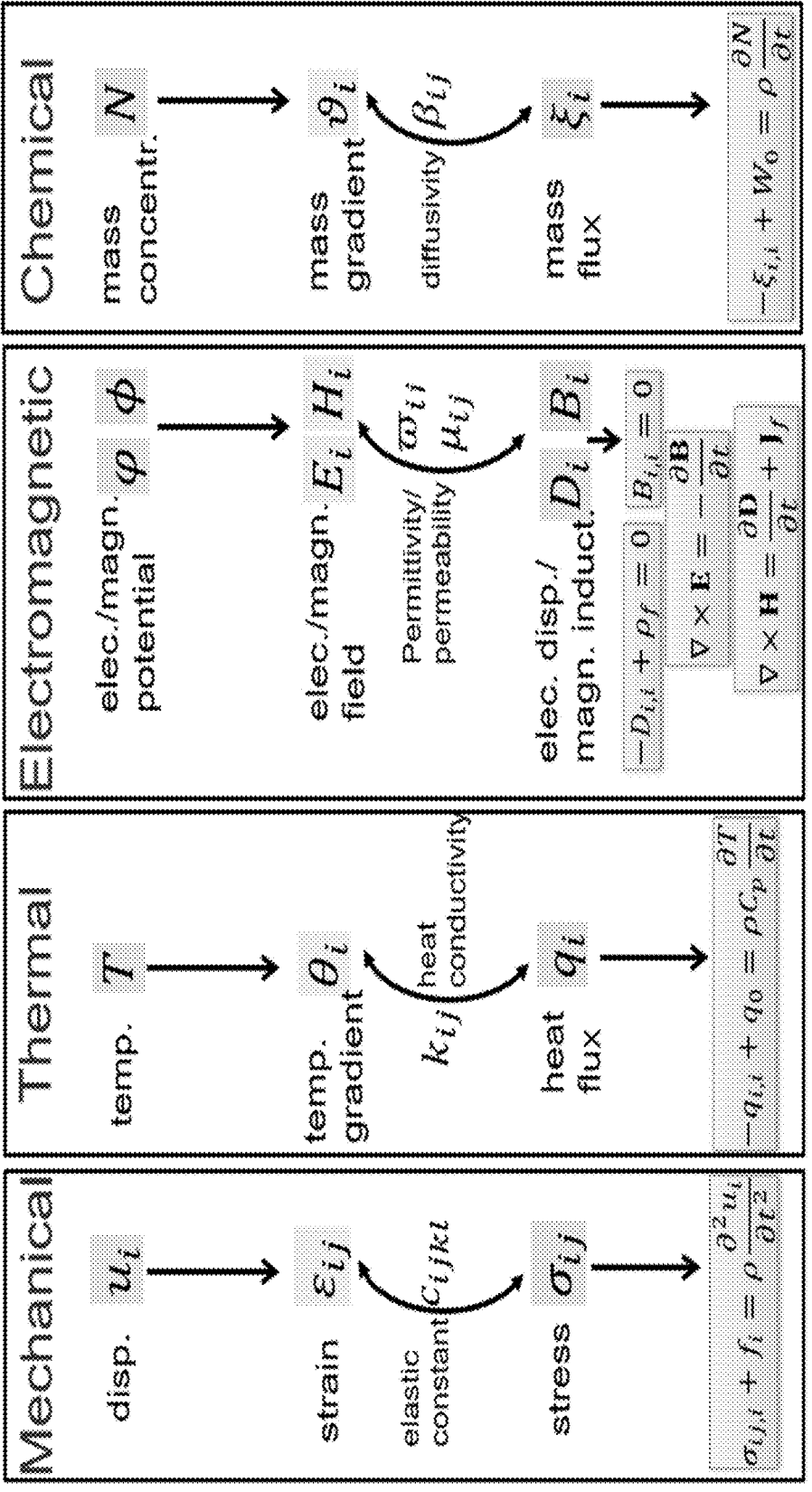
FIG. 1 is a diagram that depicts the main variables and governing equations for mechanical, thermal, electromagnetic, and chemical fields of a material in accordance with an illustrative embodiment.

Additionally, the following Greek letters are used herein. The letter $\alpha$ is distance of a node, (m, n), to the origin of the frequency domain, $\beta_{ij}$ is diffusivity tensor, $\mathcal{B}$ is homogeneous and isotropic half-space, $\varepsilon_{ij}$ is elastic strain tensor, $\theta_i$ is gradient of temperature rise, $\Theta$ is volumetric strain, $\Theta = u_{x,x} + u_{y,y} + u_{z,z}$, $\vartheta_i$ is gradient of mass concentration, $\kappa_c$ is spring imperfect index, $\lambda$, G are Lamé constants, $$\lambda = \frac{\nu E}{[(1+\nu)(1-2\nu)]}, \text{ and}$$

$$G = \frac{E}{[2(1+\nu)]}, \mu_{ij}$$

is magnetic permeability tensor, $\nu$ is Poisson's ratio, $\xi_i$ is a diffusion flux vector, $\omega_e$ is elastic wave frequency, $\omega_N$ is diffusion wave frequency, $\omega_t$ is thermal wave frequency, $\overline{\psi}_{ij}$ is dielectric permittivity tensor, $\rho$ is mass density, $\rho_f$ is free charge density, $\sigma_{ij}$ is elastic stress, $\varphi$ is electric potential, $\Psi$ refers to generalized dual collection, $\Psi = (\sigma_{ij} \leftrightarrow -q_i \leftrightarrow -D_i \leftrightarrow -B_i \leftrightarrow -\xi_i)$, $\phi$ is magnetic potential, $\Phi$ refers to generalized field collection, $\Phi = (u_i \leftrightarrow T \leftrightarrow \varphi \leftrightarrow \phi \leftrightarrow N)$, $\Phi_i$ is the gradient of field collection, $\Phi_i = (\varepsilon_{ij} \leftrightarrow -\theta_i \leftrightarrow -E_i \leftrightarrow -H_i \leftrightarrow -\vartheta_i)$, and $\Omega$ is a generalized time-related term FIG. 1 is a diagram that depicts the main variables and governing equations for mechanical, thermal, electromagnetic, and chemical fields of a material in accordance with an illustrative embodiment. In the mechanical field, the gradient of displacement vector $u_i$ leads to the elastic strain tensor $\varepsilon_{ij} = (u_{i,j} + u_{j,i})/2$. The elastic strain tensor, $\varepsilon_{ij}$, and elastic stress tensor, $\sigma_{ij}$, are linked by the constitutive laws of $\sigma_{ij} = c_{ijkl}\varepsilon_{kl}$, with $c_{ijkl}$ for the elastic property tensor. The elastic stress tensor, $\sigma_{ij}$, satisfies the mechanical equilibrium of $$\sigma_{ij,i} + f_i = \rho \frac{\partial^2 u_i}{\partial t^2},$$

where $f_i$ is the body-force component, $\rho$ is the mass density, and t is time.

In the thermal field, the gradient of temperature rise T is defined as vector $\theta_i$ satisfying the equation of $\theta_i = -T_{,i}$. The Fourier's law for heat conduction defines heat flux $q_i$ as $q_i = k_{ij}\theta_j$, with $k_{ij}$ for the heat conductivity tensor. The first law of thermodynamics is written in the form of $$-q_{i,i} + q_0 = \rho C_p \frac{\partial T}{\partial t},$$

where $q_o$ is the strength of a volumetric heat source, $C_p$ is the specific heat capacity.

In the electromagnetic field, the gradient of electric potential $\varphi$ is the strength of the electric field, expressed as $E_i = -\varphi_{,i}$ while the gradient of magnetic potential $\phi$ is the strength of the magnetic field with $H_i = -\phi_{,i}$. The constitutive relationships for electricity without polarization is $D_i = \overline{\omega}_{ij}E_j$, while for magnetism without magnetization is $B_i = \mu_{ij}H_j$, where $\overline{\omega}_{ij}$ is the dielectric permittivity tensor, $\mu_{ij}$ is the magnetic permeability tensor, $D_i$ is the electric displacement vector, and $B_i$ is the magnetic induction vector. The electric displacement should satisfy Gauss' law for electric field of $-D_{i,i} + \rho_f = 0$, with $\rho_f$ for free charge density, and the magnetic induction should satisfy Gauss' law for magnetism of $B_{i,i} = 0$. Furthermore, the Maxwell-Faraday equation $$\nabla \times E = -\frac{\partial B}{\partial t}$$

and Ampère's circuital law $$\nabla \times H = \frac{\partial D}{\partial t} + J_f$$

(with $J_f$ for current density) govern the variation of the electromagnetic field.

In the chemical field, the gradient of mass concentration N is defined as vector $\vartheta_i$, satisfying $\vartheta_i = -N_{,i}$. The diffusion-flux vector, (t, can be given by Fick's first law of $\xi_i = \beta_{ij}\vartheta_j$, with $\beta_{ij}$ for the diffusivity tensor. The mass balance in a diffusion process is $$-\xi_{i,i} + W_0 = \rho \frac{\partial N}{\partial t},$$

where $W_0$ is the intensity of a local mass source, such as the rate of a chemical reaction. Here, a linear process is assumed; however, a non-linear diffusion law can also be implemented if a localized linearization is possible.

Defining a generalized field collection $\Phi$, satisfying $\Phi=(u_i\leftrightarrow T\leftrightarrow\phi\leftrightarrow\phi\leftrightarrow N)$, a generalized dual variable collection $\Psi$, satisfying $\Psi=(\sigma_{ij}\leftrightarrow-q_i\leftrightarrow-D_i\leftrightarrow-B_i\leftrightarrow-\xi_i)$, and a generalized material property $C_M$, yielding $C_M=(c_{ijkl}\leftrightarrow k_{ij}\leftrightarrow\overline{\omega}_{ij}\leftrightarrow\mu_{ij}\leftrightarrow\beta_{ij})$, with "$\leftrightarrow$" for equivalence, results in the generalized constitutive law of $\Psi=C_M\cdot\Phi_{ii}$. If the time-related terms of the MEMCT fields are defined by a function, $\Omega(\Phi, t)$, with respect to time t and field collection $\Phi$, the generalized equilibrium equation can be written as $\Psi_{,i}+F_i=\Omega$ $(\Phi, t)$, where $F_i=(f_i\leftrightarrow q_0\leftrightarrow p_f\leftrightarrow 0\leftrightarrow W_0)$ is the strength of a generalized volumetric source.

The above variables can make a complete analogy, but it is noted that this analogy can only be stretched so far. The variables in elasticity have higher orders than those in other fields. For the field collection of $\Phi=(u_i\leftrightarrow T\leftrightarrow\phi\leftrightarrow\phi\leftrightarrow N)$, elastic displacement $u_i$ is a first-order tensor (or vector), while temperature rise T, electric potential $\phi$, magnetic potential $\phi$, and mass concentration N are zero-order tensors (or scalars). For the material properties of $C_M=(c_{ijkl}\leftrightarrow k_{ij}\leftrightarrow\overline{\omega}_{ij}\leftrightarrow\mu_{ij}\leftrightarrow\beta_{ij})$, elastic constant $c_{ijkl}$ is a fourth-order tensor, while heat conductivity $k_{ij}$, dielectric permittivity $\overline{\omega}_{ij}$, magnetic permeability $\mu_{ij}$, and chemical diffusivity $\beta_{ij}$ are second-order tensors. In the dual variable collection of $\Psi=(\sigma_{ij}\leftrightarrow-q_i\leftrightarrow-D_i\leftrightarrow-B_i\leftrightarrow-\xi_i)$, elastic stress $\sigma_{ij}$ is a second-order tensor, while heat flux $q_i$, electric displacement $D_i$, magnetic induction $B_i$, and diffusion flux $\xi_i$ are vectors.

The time scales in the MEMCT fields are different. In elasticity, the time-related term is $$\Omega = \rho\frac{\partial^2 u_i}{\partial t^2},$$

while it is $$\Omega = \rho C_p \frac{\partial T}{\partial t}$$

in the thermal field, and $$\Omega = \rho\frac{\partial N}{\partial t}$$

in the chemical field. However, the dependence of the electromagnetic field on time is governed by Maxwell's equations, i.e. the sum of Gauss' laws for electric field and magnetism, the Maxwell-Faraday equation, and Ampere's circuital law.

For clarity, the similarities and differences of the MEMCT field variables, governing equations, and the material properties pertaining to each individual field, are described in FIG. 1, which shows that the variables in the mechanical field have higher orders than those in the other fields. Theoretically, the lower order variables can be obtained from degradation of the corresponding higher-order mechanical variables.

If one considers a homogeneous and isotropic half space $\mathcal{B}$, subjected to a time-varied normal force, $\overline{p}(x, y, t)$, on its boundary along the z direction, or a time-varied heat flux, $\overline{q}(x, y, t)$, normal to the surface. For any material point (x, y, z) inside $\mathcal{B}$, the initial condition at time t=0 is:

$$u_x(x, y, z, 0) = u_x^0(x, y, z), \qquad \text{(Equation 1)}$$
$$u_y(x, y, z, 0) = u_y^0(x, y, z),$$
$$u_z(x, y, z, 0) = u_z^0(x, y, z),$$

for elasticity, and $$T(x,y,z,0)=T^0(x,y,z), \qquad \text{(Equation 2)}$$

for temperature, where $u_i^0$ is the initial displacement, $T^0$ is the initial temperature. For time t>0, the boundary condition is:

$$\sigma_{zx}(x,y,0,t)=0,$$
$$\sigma_{zy}(x,y,0,t)=0, \qquad \text{(Equation 3)}$$
$$\sigma_{zz}(x,y,0,t)=-\overline{p}(x,y,t),$$

for elasticity, and $$k_0\frac{\partial T(x, y, 0, t)}{\partial z} = -\overline{q}(x, y, t), \qquad \text{(Equation 4)}$$

for heat conduction, where $\sigma=\sigma_{ji}$ is the stress component, $k_0$ is an isotropic heat conductivity.

By comparing Equations (1) with (2), and Equations (3) with (4), there is a complete analogy between the variables in elasticity and those in heat conduction:

$$\text{displacement } u_z \leftrightarrow \text{temperature } T, \qquad \text{(Equation 5)}$$
$$\text{pressure } \overline{p} \leftrightarrow \text{surface heat flux } \overline{q} \qquad \text{(Equation 6)}$$
$$\text{stress } \sigma_{zz} \leftrightarrow k_0 \frac{\partial T}{\partial z}, \qquad \text{(Equation 7)}$$

where stress $\sigma_{zz}$ can be written as:

$$\sigma_{zz}=\lambda\Theta+2Gu_{z,z}, \qquad \text{(Equation 8)}$$

with $$\lambda = \frac{vE}{[(1 + V)(1 - 2V)]} \text{ and } G = \frac{E}{[2(1 + v)]}$$

for the Lamé constants, E for Young's modulus, v for Poisson's ratio, and $\Theta=u_{x,x}+u_{y,y}+u_{z,z}$ for the volumetric strain. In view of Equations (7) and (8), complete equivalences of $u_z\leftrightarrow T$ and $$\sigma_{zz} \leftrightarrow k_0\frac{\partial T}{\partial z}$$

lead to i) the volumetric strain $\Theta=0$, which is corresponding to incompressible elasticity with Poisson's ratio $v=0.5$; and ii) $2G \leftrightarrow k_0$.

Furthermore, in order to compare the transient behaviors in elasticity and heat conduction, one of the Lamé-Navier equations is, $$(\lambda + \mu)\Theta_{,z} + G\nabla^2 u_z + f_z = \rho \frac{\partial^2 u_z}{\partial t^2}, \qquad \text{(Equation 9)}$$

and the heat-conduction equation is, $$k_0 \nabla^2 T + q_0 = \rho C_p \frac{\partial T}{\partial t}, \qquad \text{(Equation 10)}$$

where $f_z$ is the body force along the z direction. Again, there is a complete equivalence between body force and volumetric heat source: $f_z \leftrightarrow q_0$.

The complete equivalence of Equations (9) and (10) results from:

$$\Theta_{,z} = 0; \qquad \qquad \text{i)}$$

$$\frac{\rho}{G} \frac{\partial^2 u_z}{\partial t^2} \leftrightarrow \frac{\rho C_p}{k_0} \frac{\partial T}{\partial t}. \qquad \text{ii)}$$

For i) $\Theta_{,z}=0$, this is naturally satisfied due to $\Theta=0$ stated below Equation (8). Moreover, if z, or the power of z, is a multiplier of a term in an elastic solution, for examples, $zf(x,y,z)$, $z^2 f(x,y,z)$, variable z should be set zero, and likewise for x or y removal if the excitation source is along the x or y direction. For ii), it is found that the time scales in elasticity and in heat conduction are different. If elastic displacement $u_z$ is defined as a harmonic function $F_e$ with elastic wave frequency $\omega_e$, and temperature T is defined as another harmonic function $F_t$ with thermal wave frequency $\omega_t$, condition $$\frac{\rho}{G} \frac{\partial^2 u_z}{\partial t^2} \leftrightarrow \frac{\rho C_p}{k_0} \frac{\partial T}{\partial t}$$

yields $$\omega_e^2 \leftrightarrow -\frac{i C_p}{2}\omega_t.$$

For example, if an elastic displacement has a harmonic solution of $u_z(x, y, z, t)=Z_1(x, y, z) \cdot e^{-i\omega t}$ with $\omega$ for the wave frequency, temperature should have a harmonic solution in the form of $$T(x, y, z, t) = Z_2(x, y, z) \cdot e^{\frac{2\omega^2}{C_p} \cdot t}.$$

In summary, such a complete equivalence between elasticity and heat conduction is obtained by setting: i) Poisson's ratio $v=0.5$; ii) shear modulus $2G \leftrightarrow$ heat conductivity $k_0$; iii)

removing term with z if it is presented individually in the elastic solutions, such as $zu_z$, $z^2 u_z$, etc.; and iv) elastic wave frequency $\omega_e^2 \leftrightarrow$ thermal wave frequency $$-\frac{i C_p}{2}\omega_t.$$

Two examples (the Papkovich-Neuber potentials and Galerkin vectors) are given below to explain how to make use of the equivalent method between elasticity and heat conduction.

Solutions using Papkovich-Neuber potentials are described below. Considering an isotropic and homogeneous elastic half-space, whose surface is subjected to normal force P at the origin and along the z direction, the elastic displacement, $u_z$, is:

$$u_z(x, y, z) = \frac{P}{4\pi G}\left[\frac{z^2}{r^3} + \frac{2(1-v)}{r}\right], \qquad \text{(Equation 11)}$$

where $r = \sqrt{x^2+y^2+z^2}$.

For the problem of an isotropic and homogeneous half-space subjected to a surface point heat source, Q, by making $v=0.5$, $2G \rightarrow k_0$, $P \rightarrow Q$ and removing the term with individual variable z, which means to remove the first term, $$\frac{z^2}{r^3},$$

in Equation (11), the temperature distribution can be obtained as follows:

$$T(x, y, z) = \frac{Q}{2\pi k_0}\frac{1}{r}. \qquad \text{(Equation 12)}$$

A layered half-space was also considered. Because it is difficult to obtain the space-domain analytical solutions for a layered half-space subjected to a unit normal force, the frequency response functions (FRFs) can be solved first. The FRFs for normal displacement $u_z$ are:

$$\tilde{F}_r^{(u_z)} \approx = \frac{1}{2G_r}\left[-\alpha\left(D_r e^{-\alpha z_r} - \bar{D}_r e^{\alpha z_r}\right) - \right. \qquad \text{(Equation 13)}$$

$$\left. (3 - 4v_r)\left(C_r e^{-\alpha z_r} + \bar{C}_r e^{\alpha z_r}\right) - z_r\alpha\left(C_r e^{-\alpha z_r} - \bar{C}_r e^{\alpha z_r}\right)\right],$$

where $a = \sqrt{m^2+n^2}$ denotes the distance of a node, (m,n), to the origin of the frequency domain. Subscript r=1 or 2 is used to distinguish variables associated with the layer or substrate half-space, respectively. Coefficients $C_r$, $\bar{C}_r$, $D_r$ and $\bar{D}_r$ ($\bar{C}_2 = \bar{D}_2 = 0$) can be found in the literature.

For the problem of a layered half-space subjected to a unit point heat source, the inventors used $2G_r \leftrightarrow k_r$ and $v_r=0.5$, and removed the term with individual z and h, because h resembles z, which means that the last term, $z_r a(C_r e^{-\alpha z_r} - \overline{C}_r e^{\alpha z_r})$ in Equation (13) was removed, and the term was multiplied by 2ah in $C_r$, $\overline{C}_r$, $D_r$ and $\overline{D}_r$. Therefore, the FRFs for temperature T can be obtained from Equation (13), $$\tilde{F}_r^{(T)} = \frac{1}{k_r}\left(C_r e^{-\alpha z_r} + \overline{C}_r e^{\alpha z_r}\right), \tag{Equation 14}$$

where $$C_1 = \frac{1}{\alpha\left(1 - k_3 e^{-2\alpha h}\right)}, \quad \overline{C}_1 = \frac{k_3 e^{-2\alpha h}}{\alpha\left(1 - k_3 e^{-2\alpha h}\right)},$$

$$C_2 = \frac{(1 - k_3)e^{-\alpha h}}{\alpha\left(1 - k_3 e^{-2\alpha h}\right)}, \text{ and } D_r = \overline{D}_r = 0,$$

with h for layer thickness, and $k_3 = (k_1 - k_2)/(k_1 + k_2)$.

Figures 2A, 2B:
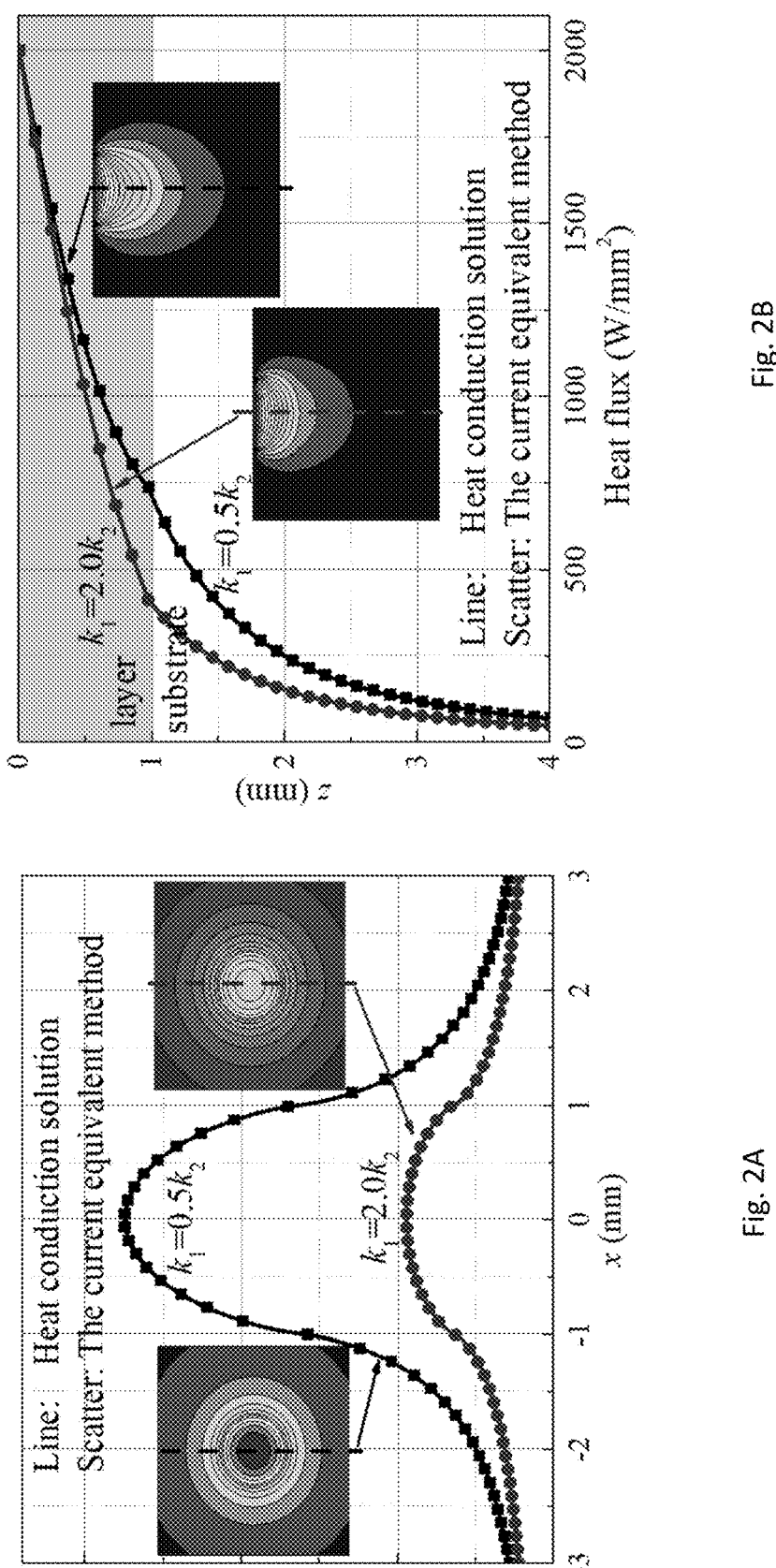
FIG. 2A depicts surface temperature of a layered half-space solved by the current equivalence method the heat condition solutions, for the problem of a uniform surface heat input in accordance with an illustrative embodiment.
FIG. 2B depicts sub-surface heat flux of the layered half-space solved by the current equivalence method the heat condition solutions, for the problem of a uniform surface heat input in accordance with an illustrative embodiment.

FIG. 2 compares the surface temperature and sub-surface heat flux distributions of a layered half-space solved by the current equivalent method via elastic solutions and the heat conduction solutions, using a discrete convolution-fast Fourier transform (DC-FFT) algorithm with a 256×256×100 grid on a physical domain of 6.0 mm×6.0 mm×4.0 mm, for the problem of a uniform surface heat input of density 2000 W/mm² on region $\sqrt{x^2 + y^2} \leq 1.0$ mm. The layer thickness is h=1.0 mm, the substrate conductivity is $k_2$=25 W/mm·K, and the layer conductivity is $k_1$=0.5$k_2$ or 2.0$k_2$. FIG. 2A depicts surface temperature of a layered half-space solved by the current equivalence method the heat condition solutions, for the problem of a uniform surface heat input in accordance with an illustrative embodiment. FIG. 2B depicts sub-surface heat flux of the layered half-space solved by the current equivalence method the heat condition solutions, for the problem of a uniform surface heat input in accordance with an illustrative embodiment. As shown, the results of the temperature and heat flux from the current equivalent method based on the elastic solutions, are identical to those from the heat conduction solutions.

Solutions built on the Galerkin vectors were explored. One can imagine an isotropic and homogeneous media (e.g. full space or half space) contains a volumetric irregular region subject to eigenstrains distributed arbitrarily. The elastic displacement $u_i$ caused by the eigenstrains can be expressed in terms of the Galerkin vectors, $F_i$, $$2Gu_i = 2(1-v)F_{i,jj} - F_{j,ji} \tag{Equation 15}$$

In Equation 15, it is noted that the standard index notation is used, where comma represents differentiation with respect to the suffix coordinate, and the Einstein summation convention is used for repeated index. The subscripts 1, 2 and 3 of variables indicate those along the x, y and z directions, respectively.

Complete equivalences of $u_z \leftrightarrow T$ and Poisson's ratio v=0.5 lead to the temperature field in terms of the Galerkin vectors, $F_i$, $$u_i = \frac{1}{2G}(F_{i,jj} - F_{j,ji})_{v=0.5} \rightarrow T = \tag{Equation 16}$$

$$D_1(F_{3,jj} - F_{3,33}) = D_1\left(F_{,jj}^T - F_{,33}^T\right),$$

where $D_1$ is a constant. Substitution of Equation (16) into the heat conduction equation (Equation (10)) and ignoring the transient term and body source, yield to the following. For a homogeneous full-space, one can consider single mechanical forces in the x, y, or z directions of the full space, such that the magnitudes of the Galerkin vectors are all the same as $$F = C_A R^I = \frac{R^I}{8\pi(1-v)},$$

where $\phi' = 1/R^I$ and $R = \sqrt{(x-x')^2 + (y-y')^2 + (z-z')^2}$.

According to Equation (15), the elastic displacement $u_z$ is, $$2Gu_z = 2(1-v)F_{,jj} - F_{,33} = \frac{1}{8\pi(1-v)} \tag{Equation 17}$$

$$\left(4(1-v)\phi^I - \phi^I - (z-z')\phi_{,3}^I\right) \xrightarrow{remove\ z-term} \frac{3-4v}{8\pi(1-v)} \frac{1}{R}$$

where $\phi = 1/R^I$ and $R = \sqrt{(x-x')^2 + (y-y')^2 + (z+z')^2}$.

By using the equivalences between Equation (17) and Equation (11), which are: i) Poisson's ratio v=0.5; ii) shear modulus 2G $\leftrightarrow$ heat conductivity $k_0$; iii) removing term z if it is presented individually in elastic solutions, Equation (17) becomes the following:

$$T = \frac{1}{4\pi k_0}\frac{Q}{R^I}, \tag{Equation 18}$$

where the displacement $u_z \leftrightarrow$ temperature T. Equation (18) is exactly the full-space heat conduction solution for temperature field under a steady point source, twice that of the half-space solutions. Therefore, $$D_1 = \frac{Q}{4\pi k_0}, \text{ and } F^T = R^I$$

by the comparison of Equations (16) and (18).

For a half space loaded by a surface force along the z direction, the Galerkin vector is:

$$g_3 = \frac{1}{8\pi(1-v)}\begin{bmatrix} 0 \\ 0 \\ R^I + (3-4v)R - 2z \cdot z'\phi - 4Dz'\psi - 4HD\theta \end{bmatrix}^T \tag{Equation 19}$$

where D=1−2v, $\theta$=R−zln[R+z], $\Psi$=ln[R+z]. By dropping the terms with D and z-terms, Equation (19) becomes, $$g_3 = \frac{1}{4\pi(1-v)}\begin{bmatrix} 0 \\ 0 \\ R^I \end{bmatrix}^T, \tag{Equation 20}$$

which is twice that of the full space solution (same with the temperature field).

A half-space with inside sources was also considered. The Galerkin vector for a single force along z direction inside the half-space is, $$g_3 = \frac{1}{8\pi(1-v)}\begin{bmatrix} 0 \\ 0 \\ R^I + (3-4v)R - 2z\cdot z'\phi - 4Dz'\psi - 4HD\theta \end{bmatrix}^T \quad \text{(Equation 21)}$$

The displacement $u_z$ is, $$8\pi G u_z = \frac{1}{R^I} + \frac{1}{R} \quad \text{(Equation 22)}$$

While the Galerkin vector for heat conduction is $$F = g_3 = \frac{1}{8\pi(1-v)}\begin{bmatrix} 0 \\ 0 \\ R^I + R \end{bmatrix}^T \quad \text{(Equation 23)}$$

Therefore, the temperature is $$T = D_1\left(F_{,jj}^T - F_{,33}^T\right) = \frac{Q}{4\pi k_0}\left(\frac{1}{R^I} + \frac{1}{R}\right) \quad \text{(Equation 24)}$$

Equation (22) is equivalent to Equation (24) by letting $2G \leftrightarrow k_0$.

A full-space with eigenstrains was also explored. Considering an isotropic and homogeneous full space contains a volumetric irregular region subject to eigenstrains distributed arbitrarily, the full-space elastic problem for with eigenstrains is solved in part using a core function, where the core function is $$F(x) = \frac{G}{4\pi(1-v)}\int_\Omega (2ve_{kk}g_c - e_{jk}g_{jk})dx'.$$

Letting Poisson's ratio $v=0.5$, the core function becomes, $$F = -\frac{G}{2\pi}\begin{bmatrix} e_{1j}R_{,j}^I \\ e_{2j}R_{,j}^I \\ e_{3j}R_{,j}^I \end{bmatrix} \quad \text{(Equation 25)}$$

By using the $F_3$ component, the temperature in Equation (16) can be expressed as:

$$T = D_1\left(F_{,jj}^T - F_{,33}^T\right) = D_1 e_{3j}\left(R_{,jkk}^I - R_{,j33}^I\right) \rightarrow D_1 e_{3j}\phi_{,j}^I, \quad \text{(Equation 26)}$$

where $e_{3j}$ is the eigen-temperature gradient. By comparison of Equations (25) and (26) and considering $2G \leftrightarrow k_0$, it yields to $$D_1 = \frac{k_0}{4\pi},$$

which is identical to that in the literature.

For a half-space with eigenstrains, by letting the Poisson's ratio $v=0.5$ and dropping the z-containing terms, the Galerkin vectors are $$g_{f1} = \begin{bmatrix} \frac{\partial(R^I+R)}{\partial x'} & \frac{\partial(R^I+R)}{\partial y'} & \frac{\partial(R^I+R)}{\partial z'} \\ 0 & 0 & 0 \\ 0 & 0 & 2R_{,1} \end{bmatrix}^T \quad \text{(Equation 27)}$$

$$g_{f2} = -\begin{bmatrix} 0 & 0 & 0 \\ \frac{\partial(R^I+R)}{\partial x'} & \frac{\partial(R^I+R)}{\partial y'} & \frac{\partial(R^I+R)}{\partial z'} \\ 0 & 0 & 2R_{,2} \end{bmatrix}^T \quad \text{(Equation 28)}$$

(Equation 29)

$$g_{f3} = -\begin{bmatrix} 0 & 0 & 0 \\ 0 & 0 & 0 \\ \frac{\partial(R^I+R)}{\partial x'} & \frac{\partial(R^I+R)}{\partial y'} & \frac{\partial(R^I+R-2z\cdot z'\phi)}{\partial z'} \end{bmatrix}^T$$

Therefore, (Equation 30)

$$g = \begin{bmatrix} -e_{1j}(R^I+R)_{,rj} + 2e_{13}R_3 \\ -e_{2j}(R^I-R)_{,rj} + 2e_{32}R_3 \\ -e_{j3}(R_{,rj}^I - R_{,rj}) - 2e_{33}z\phi \end{bmatrix}^T = \begin{bmatrix} -e_{1j}(R^I+R)_{,rj} + 2e_{13}R_{,3} \\ -e_{2j}(R^I-R)_{,rj} + 2e_{32}R_{,3} \\ -e_{j3}(R_{,rj}^I - R_{,rj}) \end{bmatrix}^T$$

By setting $$F^T = -e_{j3}(R_{,rj}^I - R_{,rj}),$$

the temperature is $$T = \frac{k_0}{4\pi}\left(F_{,jj}^T - F_{,33}^T\right) = \frac{k_0}{4\pi}e_{3j}\left(\phi_{,j}^I + \phi_{,j}\right) \quad \text{(Equation 31)}$$

In summary, by making the mechanical-thermal equivalence: (i) If the results are structured from the Papkovich-Neuber solutions, which only have harmonic potentials, the analogy can be done directly at the final solutions, or at any step of the solution derivation; (ii) For solutions built on the Galerkin vectors, one can use $F_3$ only due to solution symmetry for half-space problems, but use of any or all of $F_i$ is optional for the full-space solutions; (iii) Because the Galerkin-vector solutions include biharmonic potentials, not all terms are proper for the Galerkin vectors for temperature. For homogeneous materials, direct result analogy is applicable, but for inhomogeneous materials, analogy should be done at the Galerkin-vector stage. FIG. 3 is a table that summarizes the Galerkin vectors for elastic and temperature problems in accordance with an illustrative embodiment.

Thermal-chemical equivalence was also studied. Again, one can consider a chemical species diffusing into a homogeneous and isotropic half-space $\mathcal{B}$ across its surface, with a time-varied surface diffusive flux $\xi(x, y, t)$. For any material point $(x, y, z)$ inside $\mathcal{B}$, the initial condition for mass concentration of the diffusive species at time $t=0$ is:

$$N(x,y,z,0) = N^0(x,y,z), \quad \text{(Equation 32)}$$

with $N^0$ for the initial mass concentration of the diffusive species. For time $t>0$, the boundary condition is,

15

$$\beta_0 \frac{\partial N(x, y, 0, t)}{\partial z} = -\bar{\xi}(x, y, t), \quad \text{(Equation 33)}$$

where $\beta_0$ is the diffusivity.

It has been shown in FIG. 1 that the chemical variables are in a complete analogy with the heat-conduction variables, i.e.:

mass concentration $N \leftrightarrow$ temperature $T$, (Equation 34)

surface diffusive flux $\bar{\xi} \leftrightarrow$ surface heat flux $\bar{q}$, (Equation 35)

diffusivity $\beta_0 \leftrightarrow$ conductivity $k_0$, (Equation 36)

mass source $W_0 \leftrightarrow$ heat source $q_0$, (Equation 37)

$\frac{\partial N}{\partial t} \leftrightarrow C_p \frac{\partial T}{\partial t}$. (Equation 38)

It is found from Equation (38) that the time scales in chemical and thermal fields are different. If the mass concentration N is defined as a harmonic function $F_N$ of diffusion wave frequency $\omega_N$, and the temperature T is defined as $F_t$ of thermal wave frequency $\omega_t$, mentioned above, condition $$\frac{\partial N}{\partial t} \leftrightarrow C_p \frac{\partial T}{\partial t}$$

result in $\omega_N \leftrightarrow C_p \omega_t$. The equivalence between heat conduction and chemical diffusion also effects the equivalence between elasticity and chemical diffusion.

Thermal-electromagnetic equivalence was considered. The dependence of electromagnetic fields on time is governed by Maxwell's equations, which means that the magnetic and electric fields are mutually affected. The electromagnetic wave propagation can be equivalent to the elastic wave propagation. Considering the fact that the frequency of magnetoelectric waves is much higher than those of the mechanical, thermal, or chemical diffusion waves, only the static electromagnetic solutions are carried out here. If the transient behaviors of electromagnetic field are ignored, the Maxwell-Faraday equation and Ampere's circuital law vanish, and only the Gauss' laws for electricity and magnetism remain.

One can consider a homogeneous and isotropic half-space, $\mathcal{B}$, subjected to static surface electrical flux $i_e(x, y)$ and surface magnetic flux $i_m(x, y)$. For any material point (x, y, z) inside B, the boundary conditions are, $D(x,y,0,t)=-i_e(x,y,t),$ (Equation 39)

$B(x,y,0,t)=-i_m(x,y,t).$ (Equation 40)

The electromagnetic variables can make a complete analogy set with the thermal variables as illustrated in FIG. 1, i.e.:

electric potential $\varphi \leftrightarrow$ magnetic potential $\phi \leftrightarrow$ temperature $T$, (Equation 41)

electrical flux $i_e \leftrightarrow$ magnetic flux $i_m \leftrightarrow$ heat flux $\bar{q}$, (Equation 42)

permittivity $\bar{\omega}_0 \leftrightarrow$ permeability $\mu_0 \leftrightarrow$ conductivity $k_0$, (Equation 43)

free charge density $\rho_f \leftrightarrow$ heat source $q_0$. (Equation 44)

16

Likewise, this effects the equivalence between elasticity and static electromagnetics.

The inventors also studied the Equivalence in MEMCT field coupling. The generalized constitutive equations can be written as follows to complement the MEMCT coupled theory:

$$\Psi = M \cdot \Phi_{ij}, \quad \text{(Equation 45)}$$

where the generalized dual variable collection is $\Psi = (\sigma_{ij} \leftrightarrow -q_i \leftrightarrow -D_i \leftrightarrow -B_i \leftrightarrow -\xi_i)$, the state variable collection is $\Phi_{ij} = (\varepsilon_{ij} \leftrightarrow -\theta_i \leftrightarrow -E_i \leftrightarrow -H_i \leftrightarrow -\vartheta_i)$, and the generalized material matrix, [M], includes the coupling properties is, $$M = \begin{bmatrix} c_{ijkl} & \lambda_{ijk} & e_{ijk} & d_{ijk} & a_{ijk} \\ & k_{ij} & h_{ij} & m_{ij} & b_{ij} \\ & & \varpi_{ij} & g_{ij} & t_{ij} \\ & sym. & & \mu_{ij} & s_{ij} \\ & & & & \beta_{ij} \end{bmatrix}. \quad \text{(Equation 46)}$$

The diagonal terms in [M] are the material properties, C, in each individual field, and $C_M = (c_{ijkl} \leftrightarrow k_{ij} \leftrightarrow \bar{\omega}_{ij} \leftrightarrow \mu_{ij} \leftrightarrow \beta_{ij})$, and the other elements in [M] denote the field coupling parameters, A, with $A = (\lambda_{ijk} \leftrightarrow e_{ijk} \leftrightarrow d_{ijk} \leftrightarrow a_{ijk} \leftrightarrow h_{ij} \leftrightarrow m_{ij} \leftrightarrow b_{ij} \leftrightarrow g_{ij} \leftrightarrow t_{ij} \leftrightarrow s_{ij})$. For example, $\lambda_{ijk}$, $e_{ijk}$, $d_{ijk}$ and $a_{ijk}$ are the elastic-thermal tensor, piezoelectric tensor, piezomagnetic tensor, and elastic-chemical tensor, respectively, where $\lambda_{ij} = c_{ijkl} a_{kl}$ with $a_{kl}$ denoting thermal expansion coefficients. $h_{ij}$, $m_{ij}$, $b_{ij}$, $g_{ij}$, $t_{ij}$, and $s_{ij}$ are the pyroelectric coefficient, pyroelectric coefficient, pyrochemical coefficient, magnetoelectric coefficient, electric-chemical constant, and magnetic-chemical constant, respectively. The analyses above shows that the lower-order variables can be obtained from degrading the corresponding higher-order mechanical variables and the equivalating related material properties. Besides the material properties $C_M$ pertaining to each individual field, in the field coupling parameters, $A = (\lambda_{ijk} \leftrightarrow e_{ijk} \leftrightarrow d_{ijk} \leftrightarrow a_{ijk} \leftrightarrow h_{ij} \leftrightarrow m_{ij} \leftrightarrow b_{ij} \leftrightarrow g_{ij} \leftrightarrow t_{ij} \leftrightarrow s_{ij})$, the mechanics-related coupling parameters, $\lambda_{ijk} \leftrightarrow e_{ijk} \leftrightarrow d_{ijk} \leftrightarrow a_{ijk}$, are also in higher orders. As an example, the thermo-electro-mechanical solutions for multilayered materials can be obtained from the recent multilayered electromagnetic-mechanical solutions by using the equivalences of (i) dual variables ($q_i \leftrightarrow B_i$), (ii) state variables ($\theta_i \leftrightarrow H_i$), (iii) individual parameters ($k_{ij} \leftrightarrow \mu_{ij}$), and (iv) coupling parameters ($\lambda_{ijk} \leftrightarrow d_{ijk}$) and ($h_{ij} \leftrightarrow g_{ij}$), where $h_{ij}$ are the pyroelectric coefficients, and $g_{ij}$ the magnetoelectric coefficients.

Figure 4:
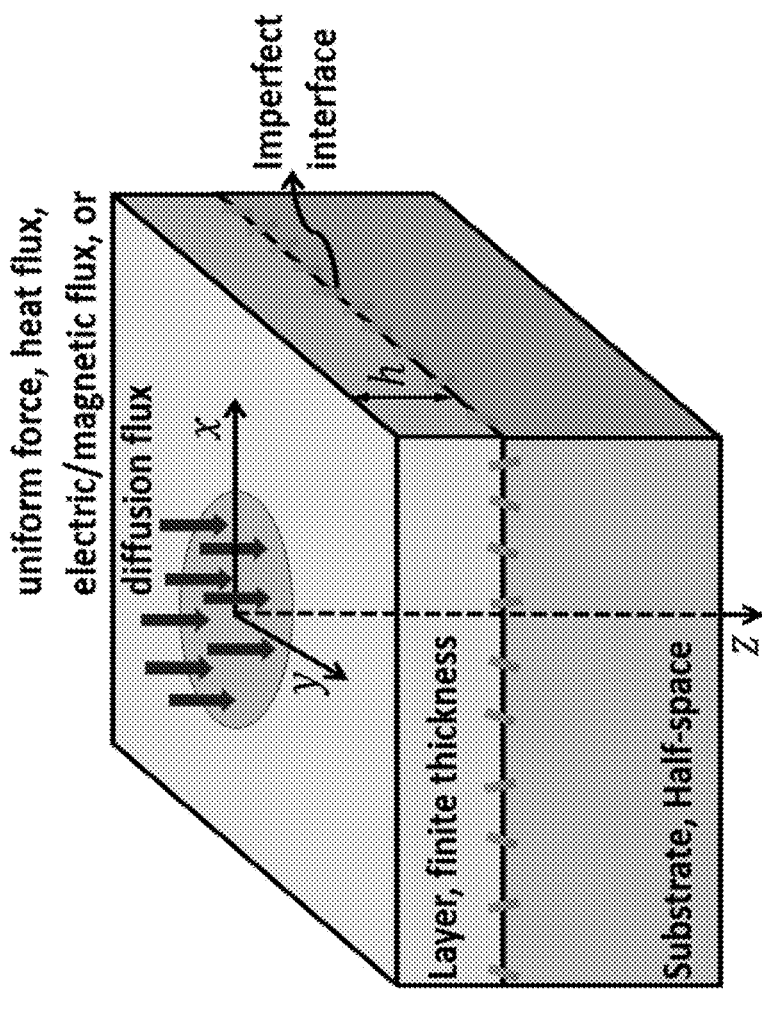
FIG. 4 illustrates an example of a layered half-space with imperfect layer-substrate interfaces, where the layer thickness is h, and a uniform force, heat flux, electric/magnetic flux, or diffusion flux is applied on the top surface of the layer in accordance with an illustrative embodiment.

Material interfaces between two or more constituent solids with different properties are commonly found in various material structures, such as the coating-substrate interface in layered materials and inclusion-matrix interface in composites. Due to property mismatching, crystal defects, or impurities, the material interfaces may involve a bonding issue. The imperfect interfaces would affect the transmissions of force and/or displacement in elasticity, influence heat transfer, cause the imperfect gluing and/or soldering in electronic packaging, and reduce the charge-diffusion rate in batteries. The imperfect interfaces in elasticity have been addressed most deeply, such as the spring-like interface in layered materials, coupled dislocation-like and force-like interfaces in layered materials, and in joined half-spaces. FIG. 4 illustrates an example of a layered half-space with imperfect layer-substrate interfaces, where the layer thickness is h, and a uniform force, heat flux, electric/magnetic flux, or diffusion flux is applied on the top surface of the layer in accordance with an illustrative embodiment.

A set imperfect mechanical interface conditions, known as the spring-like conditions of layered materials, can be written as, $$\kappa_c \left[ u_i^L(x, y, h) - u_i^S(x, y, 0) \right] = -\sigma_{3i}^L(x, y, h), \qquad \text{(Equation 47)}$$

$$\sigma_{3i}^L(x, y, h) = \sigma_{3i}^S(x, y, 0),$$

$$\kappa_c \in [0, \infty); i = 1, 2, 3,$$

where $\kappa_c$ is a spring-imperfection index, superscript S or L is used to distinguish variables associated with the layer or the substrate half space, and h denotes the layer thickness. The spring-like interface conditions in Equation (47) show that the interfacial stresses are continuous, but the interfacial displacements are discontinuous, governed by spring index $\kappa_c$. When $\kappa_c$ is infinite, $u_i^L(x, y, h)$ approaches $u_i^S(x, y, 0)$, which is referred to as the perfectly bonded interface condition. A debonding interface occurs as Kc approaches zero.

The imperfect thermal impedance conditions of the layered materials can be written as, $$r_t \left[ T^L(x, y, h) - T^S(x, y, 0) \right] = q_3^L(x, y, h), \qquad \text{(Equation 48)}$$

$$q_3^L(x, y, h) = q_3^S(x, y, 0),$$

$$r_t \in [0, \infty),$$

where $r_t$ is the thermal conductance, and $q_3$ is the normal heat flux. When $r_t=0$, the interface is a complete thermal barrier, while the heat conduction across the interface is perfect as $r_t$ approaches infinity.

The imperfect magnetoelectric interface conditions are given by, $$r_e \left[ \varphi^L(x, y, h) - \varphi^S(x, y, 0) \right] = D_3^L(x, y, h), \qquad \text{(Equation 49)}$$

$$D_3^L(x, y, h) = D_3^S(x, y, 0),$$

$$r_e \in [0, \infty),$$

and $$r_m \left[ \phi^L(x, y, h) - \phi^S(x, y, 0) \right] = B_3^L(x, y, h), \qquad \text{(Equation 50)}$$

$$B_3^L(x, y, h) = B_3^S(x, y, 0),$$

$$r_m \in [0, \infty),$$

where $r_e$ is the electric capacitor parameter, $r_m$ is the magnetic inductor parameter, $D_3$ denotes the normal electric displacement, $B_3$ is the normal magnetic induction. When $r_e=0$, the interface is a complete electric barrier, while the electric conduction across the interface is perfect as $r_e$ approaches infinity. Likewise, when $r_m=0$, the interface has a completely magnetic barrier, while the interface is magnetically perfect as $r_m$ approaches infinity.

The mass diffusion imperfect interface conditions are given by:

$$r_c \left[ N^L(x, y, h) - N^S(x, y, 0) \right] = \xi_3^L(x, y, h), \qquad \text{(Equation 51)}$$

$$\xi_3^L(x, y, h) = \xi_3^S(x, y, 0),$$

$$r_c \in [0, \infty),$$

where $r_c$ is the transmission parameter, N is the mass concentration, $\xi_3$ is the normal diffusion flux. Similarly, if $r_c=0$, the interface is a complete diffusion barrier, while the solution transmission is perfect as $r_c$ approaches infinity.

Based on the analogies of field collection $\Phi=(u_3 \leftrightarrow T \leftrightarrow \varphi \leftrightarrow \phi \leftrightarrow N)$, and dual variable collection $\Psi=(\sigma_{3j} \leftrightarrow -q_3 \leftrightarrow -D_3 \leftrightarrow -B_3 \leftrightarrow -\xi_3)$, the imperfect conditions in Equations (31-34) can be equivalent by letting $\kappa_c \leftrightarrow r_t \leftrightarrow r_e \leftrightarrow r_m \leftrightarrow r_c$, for the problem illustrated in FIG. 4. FIGS. 5 and 6 show the thermal and electric behaviors of this layered half-space with imperfect thermal and electric interfaces, respectively, solved by the current equivalence method based on the elastic solutions using the discrete convolution and fast Fourier transform (DC-FFT) algorithm with a 256×256×100 grid for the domain of 6.0 mm×6.0 mm×4.0 mm. The layer thickness is h=1.0 mm.

Figure 5B:
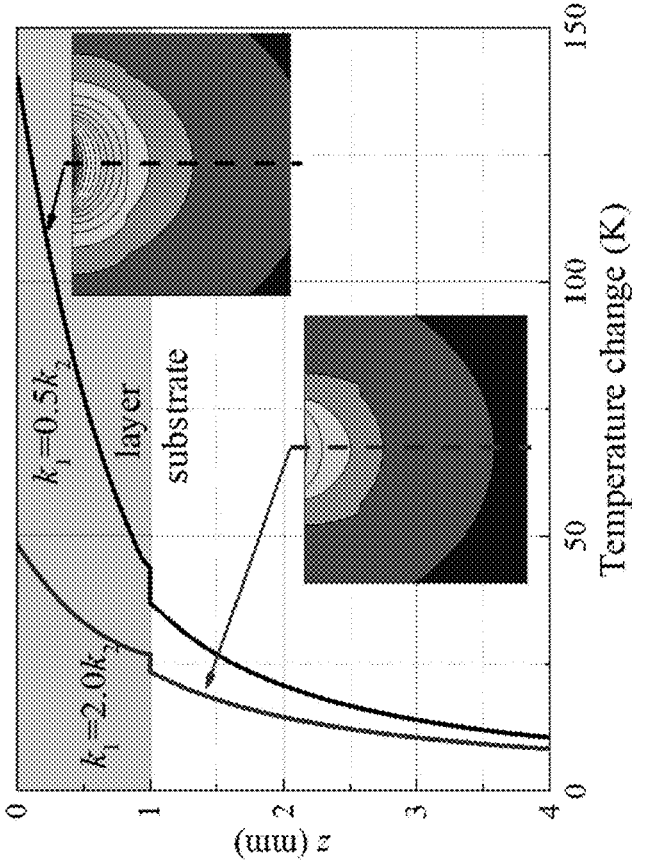
FIG. 5B shows the subsurface temperature distributions along the z direction for heat conductivities of $k_1$=0.5$k_2$ and 2.0$k_2$ in accordance with an illustrative embodiment.
Figure 5A:
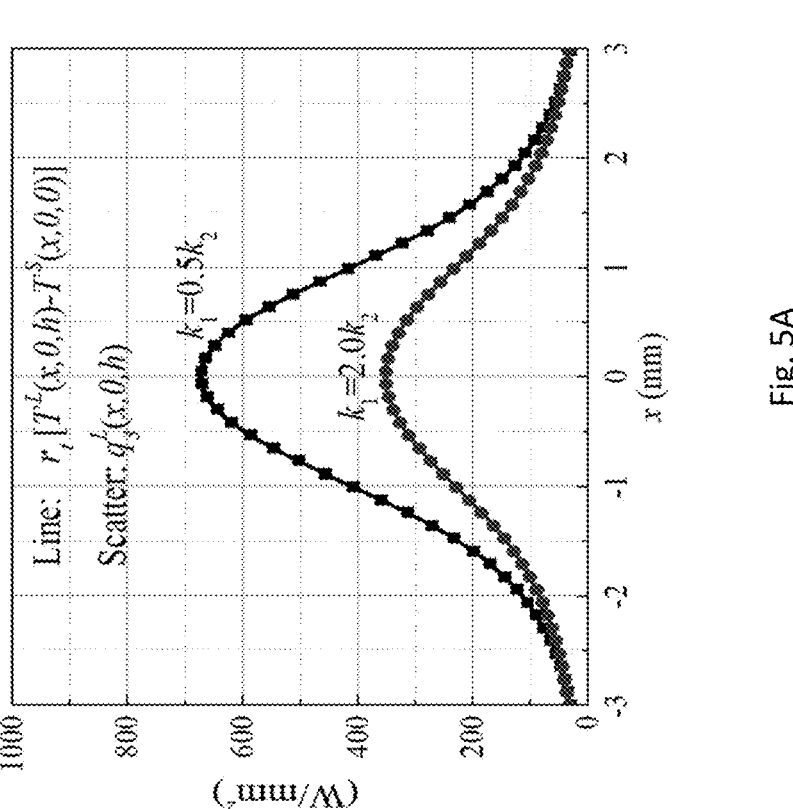
FIG. 5A is a plot of the interfacial heat flux $$q_3^I(x, y, h),$$

Specifically, FIG. 5A is a plot of the interfacial heat flux $$q_3^L(x, y, h),$$

as well as the interfacial temperature difference, with thermal conductance $r_t=100$ W/mm²·K, for the problem of a uniform surface heat input of density 2000 W/mm² on region $\sqrt{x^2+y^2} \leq 1.0$ mm in accordance with an illustrative embodiment. The substrate conductivity is $k_2=25$ W/mm·K, and the layer conductivity is $k_1=0.5k_2$ or $2.0k_2$. The value of $r_t[T^L(x, y, h)-T^S(x, y, 0)]$ agrees well with $$q_3^L(x, y, h),$$

which is identical to the imperfectly thermal boundary condition in Equation (48). Furthermore, FIG. 5B shows the subsurface temperature distributions along the z direction for heat conductivities of $k_1=0.5k_2$ and $2.0k_2$ in accordance with an illustrative embodiment. The temperature is discontinuous in the layer-substrate interface (z=h=1.0 mm) due to the imperfectly thermal boundary condition.

Figure 6A:
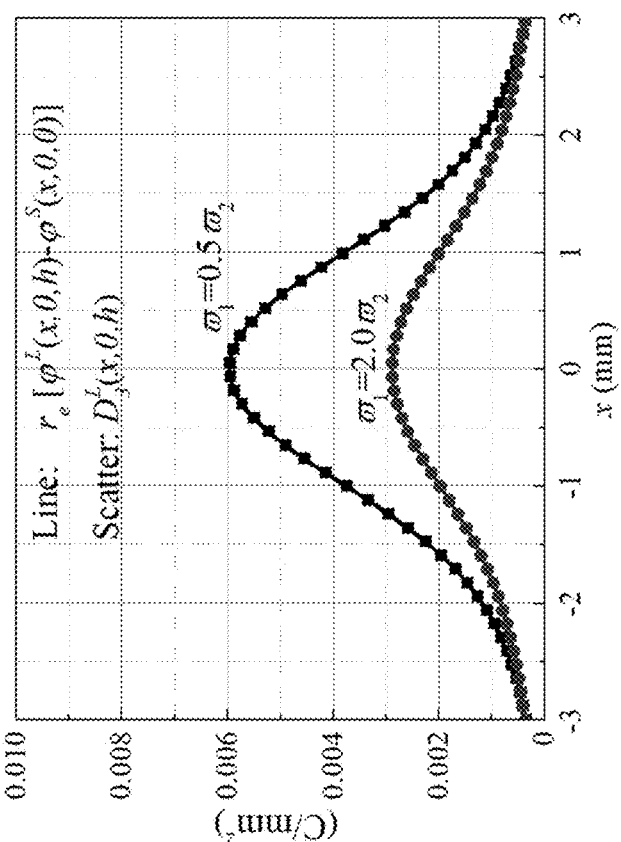

FIG. 6A is a plot of the interfacial electric flux $$D_3^L(x, y, h),$$

as well as the interfacial electric potential difference, solved by using the current equivalence method, with electric capacitor parameter $r_e=1.5 \times 10^{-2}$ C²/Nmm³, for the problem of a uniform surface electric flux of density $2 \times 10^{-2}$ C/mm² on region $\sqrt{x^2+y^2} \leq 1.0$ mm in accordance with an illustrative embodiment. The substrate dielectric permittivity is $\overline{\omega}_2 = 1 \times 10^{-2} C^2/N \cdot mm^2$, and the layer permittivity is $\overline{\omega}_1 = 0.5$ $\overline{\omega}_2$ or $2.0\overline{\omega}_2$. The value of $r_e[\varphi^L(x, y, h) - \varphi^S(x, y, 0)]$ agrees well with $$D_3^L(x, y, h),$$

which is identical to the imperfect electric boundary condition used. FIG. 6B shows the subsurface electric potential distributions along the z direction for dielectric permittivities of $\overline{\omega}_1 = 0.5\overline{\omega}_2$ and $2.0\overline{\omega}_2$ in accordance with an illustrative embodiment. The electric potential is discontinuous in the layer-substrate interface (z=h=1.0 mm) due to the imperfect electric boundary condition. The distribution behaviors of temperature T and electric potential $\varphi$ are similar, so are magnetic potential $\phi$ and mass concentration N, all obeying the analogies of field collection $\Phi=(u_3\leftrightarrow T\leftrightarrow\varphi\leftrightarrow\phi\leftrightarrow N)$.

Thus, it has been shown that for homogeneous materials or homogenized materials, a systematic analogy and unified computation methodology from elasticity to electromagnetic-chemical-thermal fields are developed by setting Poisson's ratio v=0.5 and removing terms multiplied by the power of z. This leads to the identical surface-value relation (z-multiplied terms automatically disappear at z=0) of the elasticity and thermal (or chemical, electric, magnetic) fields if the material is incompressible (v=0.5). The result indicates that if the surface elastic field of an incompressible material is measured under a unit surface force, the surface thermal (or chemical, electric, magnetic) field under a unit specific flux can be immediately obtained by using parameter conversion without additional thermal (or chemical, electric, magnetic) measurement. If $N_0$ is the surface mass concentration, $\varphi_0$ is the surface electric potential, $\phi_0$ is the surface magnetic potential, and $T_0$ is the surface potential, this means $$\frac{u_{z0}}{T_0} = \frac{P}{Q}\frac{k_0}{2G} \qquad \text{(Equation 52)}$$

$$\frac{u_{z0}}{\varphi_0} = \frac{P}{I_e}\frac{\overline{\omega}_0}{2G} \qquad \text{(Equation 53)}$$

$$\frac{u_{z0}}{\varphi_0} = \frac{P}{I_m}\frac{\mu_0}{2G} \qquad \text{(Equation 54)}$$

$$\frac{u_{z0}}{N_0} = \frac{P}{J_f}\frac{\beta_0}{2G} \qquad \text{(Equation 55)}$$

For practical materials which are not incompressible, the following relationship can be obtained from Equation (11):

$$\frac{u_{z0}}{u_{z0}(v = 0.5)} = 2(1 - v), \qquad \text{(Equation 56)}$$

where $u_{z0}=u_z(x, y, z=0)$ is the surface elastic displacement.

Equation (56) indicates that the analogy from surface elasticity to the thermal (or chemical, electric, magnetic) field can be achieved by dividing 2(1−v), which leads to the following:

$$N_0 \leftrightarrow \varphi_0 \leftrightarrow \phi_0 \leftrightarrow T_0 \leftrightarrow u_{z0}(v = 0.5) = \frac{u_{z0}}{2(1 - v)}, \qquad \text{(Equation 57)}$$

where $N_0$ is the surface mass concentration, $\varphi_0$ is the surface electric potential, $\phi_0$ is the surface magnetic potential, and $T_0$ is the surface potential. Equation (57) manifests that if the surface elastic field of a material is measured under a unit force, the surface thermal (or chemical, electric, magnetic) field under a unit specific flux can be immediately obtained through dividing the elastic response by 2(1−v).

In fact, if one of these surface field values can be measured, the other four can be immediately obtained.

$$\frac{u_{z0}}{T_0} = 2(1 - v)\frac{P}{Q}\frac{k_0}{2G} \qquad \text{(Equation 58)}$$

$$\frac{u_{z0}}{\varphi_0} = 2(1 - v)\frac{P}{I_e}\frac{\overline{\omega}_0}{2G} \qquad \text{(Equation 59)}$$

$$\frac{u_{z0}}{\varphi_0} = 2(1 - v)\frac{P}{I_m}\frac{\mu_0}{2G} \qquad \text{(Equation 60)}$$

$$\frac{u_{z0}}{N_0} = 2(1 - v)\frac{P}{J_f}\frac{\beta_0}{2G} \qquad \text{(Equation 61)}$$

This means that a multifunctional sensor can be built with on measurement system to measure one of the pairs of (P, $u_{zo}$), (Q, $T_o$), ($1_e$, $\varphi_0$), ($I_m$, $\phi_0$), ($J_f$, $N_0$). This idea can be extended to other bodies of a homogeneous (or homogenized) material, as long as the boundary conditions are consistent for the five fields of MEMCT, either equations like (58-61) can be derived, or their relations can be established through calibrations of five initial measurements with different sensors. Further, with the boundary values known, the entire distribution of one field can be conveniently predicted by the corresponding model. This suggests a multifield model-based monitoring system supported with the multifunctional surface sensor.

Thus, a systematic analogy and unified computation methodology from elasticity to electromagnetic-chemical-thermal fields are developed herein based on the similarities of mechanical-electromagnetic-chemical-thermal (MEMCT) field variables, governing equations, and the material properties pertaining to each individual field. For an isotropic material, or layered material set, subjected to different surface flux, instead of solving individual problems in each field, the thermal, electromagnetic, or chemical solutions are obtained from the direct degeneration of the corresponding elastic solutions by making Poisson's ratio v=0.5, equivalences of $2G\leftrightarrow k_0\leftrightarrow\overline{\omega}_0\leftrightarrow\mu_0\leftrightarrow\beta_0$ with G for shear modulus, $k_0$ for heat conductivity, $\overline{\omega}_0$ for dielectric permittivity, $\mu_0$ for magnetic permeability, and $\beta_0$ for chemical diffusivity. The system also performs removal of the terms that involve z (and its equivalent, h), or the power of z, as a multiplier in elastic solutions if excited along the z direction; and likewise removal of x or y if the excitation source is along the x or y direction. The system also makes equivalences of $$\omega_e^2 \leftrightarrow -\frac{iC_p}{2}\omega_t \leftrightarrow -\frac{i}{2}\omega_c,$$

with $\omega_e$ for elastic wave frequency, $\omega_t$ for thermal wave frequency, and $\omega_c$ for diffusion frequency. These equivalences also mark the time-scale differences in different fields.

For static fields, or steady-state elastic, thermal and chemical fields, measuring one at the surface excited by one type flux is sufficient to sense the others at the same location due to their corresponding flux, and thus a multifunctional sensing system can be developed using one sensor. The thermal, electromagnetic, or chemical response of a layered half-space material system with imperfect thermal, electromagnetic, or chemical interfaces is explored, and the results further confirm that the solutions can be directly obtained by applying the proposed analogy method to the elastic solutions.

FIG. 7 depicts various machining tools that can be used in conjunction with multifield, multifunctional sensors in accordance with an illustrative embodiment. The machining tools include forming tools (e.g., a router bit), cutting tools (e.g., a blade or knife), drilling tools (e.g., drill bits), and polishing tools (e.g., cloth, sanding block, etc.). The tools can be made of any tool steel, ceramics, or other metal, and the workpieces can be any materials. Machining tool surface elastic/thermal/electrical/magnetic/mass diffusion fields can be determined via monitoring the surface displacement or temperature at one location, or certain locations by means of the theory of analogy as described herein.

FIG. 8 depicts load distribution on tools surfaces in accordance with an illustrative embodiment. The tool shape can be any, and the tip can be considered as a sphere of radius R, which is also radius of curvature, or an ellipsoid with one of the principal radii of curvature to be R. The load (source) can be pressure, heat flux, mass flux, electrical flux, magnetic flux, etc. centered at location O. The variable r is the radius of load distribution, and 2r is the load distribution width (if there is a 2D problem). The variable R is the radius of a tool tip, for example from 10 microns (sharp tooling) to infinite (surface tooling), i.e., half space. The sensor location X can be anywhere from X=0 to X=~10r. The response to the tooling of displacement, temperature, electrical potential, magnetic potential, and mass concentration are obtained at location X.

FIG. 9 depicts sensor location relative to a tool surface in accordance with an illustrative embodiment. The concentrated load can be pressure, heat flux, mass flux, electrical flux, or magnetic flux at location O. When r is very small, the load becomes concentrated. R represents the radius of the tool, and sensor location X can be anywhere between X=0 and X=R/10. Load flux is at a point (line) (location O), its strength can be the average of a flux distribution if the flux distribution width (radius) is less than ~1/10 of the tool-tip radius. As noted, if the fluxes are related to pressure, then heat flux=heat flux coefficient×pressure, and mass flux=diffusion coefficient×pressure. Measuring the temperature at X can directly result in displacement, electrical field strength, magnetic field strength, and diffused mass concentration at the same location, using Equations (58-61). Equations (58-61) also give the responses at the source location O using Equation 12.

Still referring to FIG. 9, in another example, the heat flux=heat flux coefficient×mechanical load (pressure) with heat flux coefficient=friction coefficient×heat partition×velocity. If a thermal couple (temperature sensor) located at X measures the temperature as T(X), then the normal displacement $u_z$ at X is $$u_z = \frac{(1 - v)k_o T(X)}{G\mu_f},$$

where $\mu_f$ is heat-flux coefficient, $k_o$ is heat conductivity, and G is shear modulus.

Again referring to FIG. 9, it is noted that the relationship between each flux and response at X can be calibrated with the methods described above (i.e., with reference to FIG. 9). The calibration can also result in the relationship between the response at X (such as T(X)) and the response at the source location (machining location, T(O)) using Equation (12), i.e., the temperature relationship, the displacement relationships, the diffusion mass relationships, etc. Then monitoring the response values at X equals monitoring the response (and the flux source) changes at the source location, i.e., the pressure, heat source, mass flux as the source fluxes, displacement, temperature, mass concentration, etc., as the responses at the source location. The rate of changes also marks the rate of changes of the electromagnetic fluxes and fields, and their field values at O and X.

FIG. 10 depicts load distribution of a tool in contact with a known material in accordance with an illustrative embodiment. In a scenario in which r (radius of load distribution) is not small, but r<R/10, the load becomes distributed. Again, 2r refers to load distribution width (if a 2D problem), R is the radius of the tool body, and sensor location can be anywhere between X=0 and X=~10r. The load can be pressure, heat flux, mass flux, electrical flux, or magnetic flux. In FIG. 10, if the fluxes are in the same shape of the distributions, but proportional in value, then Heat flux=Heat-flux coefficient×pressure, and Mass flux=diffusion coefficient×pressure. Also, if a thermal couple at X measures the temperature as T(X), then the normal displacement $u_z$ at X is the same as discussed above with reference to FIG. 9 (i.e., $$\text{(i.e., } u_z = \frac{(1 - V)k_0 T(X)}{G\mu_f})$$

because the convolution expressions are cancelled.

It is also noted that Equations 58-61 are applicable for both concentrated and distributed fluxes as long as the flux distributions are in the same shape. The equation $$u_z = \frac{(1 - V)k_0 T(X)}{G\mu_f}$$

shows that a temperature sensor becomes a multifield sensor with Equations 58-61, and that bringing $u_z$ to Equations 59-61 allows other field values to be readily obtained. If the fluxes are not in the same shape of the distribution, individual integration/convolution can be performed using Equations 58-61 (via Equation 12) to find the other field values.

Still referring to FIG. 10, the relationship between each flux and response at X can be calibrated from the method discussed above. The calibration can also result in the relationship between the response at X and the response at the source location (machining location), i.e., the temperature relationship, the displacement relationships, the diffusion mass relationships, etc. Then monitoring the response values at X equals monitoring the response (and the flux source) changes at the source location, i.e., the pressure, the heat source, mass flux as the source fluxes, and displacement, temperature, and mass concentration, etc., as the responses at the source location. The rate of changes also marks the rate of changes of the electromagnetic fluxes and fields, and the field values at O and X.

FIG. 11 depicts load distribution and tool surfaces of different radii of curvature R in accordance with an illustrative embodiment. If the load is axis-symmetry, the measurement results at each X represent the results on a circle with X as the radius. Changing X leads to the surface field distributions. If the load is mirror symmetry about the dash-dot line, the field value at –X equals that at X. If the load is not axis-symmetry, the measurement should be done at each surface location of interest.

FIG. 12 depicts a sensing system in accordance with an illustrative embodiment. A sensor is mounted relative to a tool surface, as shown. In one embodiment, the sensor can be a thermocouple or infrared temperature detector. In an illustrative embodiment, a computing device 1200 receives sensed data from the sensor. The computing device 1200 can include a processor, a memory, a transceiver (receiver and transmitter), etc. The processor can be configured to implement Equations 58-61 to perform parameter conversions, etc. For example, the sensor can be used to measure temperature, which is provided to the computing device 1200, which uses Equations 58-61 to calculate other field values. Inputs can include elastic modulus, Poisson's ratio, thermal conductivity, dielectric permittivity, magnetic permeability, chemical diffusivity, etc. The outputs from the computing device 1200 can include temperature, displacement, electrical potential, magnetic potential, diffused mass density if inside the loading zone, or 0 if outside of the loading zone.

As another example, in the system of FIG. 12, the sensor can be a thermal couple (or infrared sensor) combined with a displacement sensor to provide a sensing system with coefficient calibration. In one embodiment, the displacement sensor can be an optical position detector that senses displacement of the tip of the thermal couple. The temperature sensor can be used to measure temperature, and the displacement sensor can be used to measure displacement at X, which is used to adjust the heat-flux coefficient and perform proportion coefficient calibration. Equations 58-61 can then be used by the computing device 1200 to compute the other values.

In an illustrative embodiment, any of the operations described herein can be performed by a computing device, as discussed with reference to FIG. 12. As another example, FIG. 13 depicts a sensing system for performing multifield, multifunctional sensing in accordance with an illustrative embodiment. In an illustrative embodiment, the computing components of the sensing system can be separate from the tool/material being tested, but can be in communication with one or more sensors mounted thereto. Alternatively, the computing components can be incorporated into the tool/material.

The sensing system includes a computing device 1302 that has a processor 1305, an operating system 1310, a memory 1315, an input/output (I/O) system 1320, a network interface 1325, and a conversion application 1330. In alternative embodiments, the computing device 1302 may include fewer, additional, and/or different components. The components of the computing device 1302 communicate with one another via one or more buses or any other interconnect system. The computing device 1302 can be any type of computing device (e.g., smartphone, tablet, laptop, desktop, etc.), including a dedicated standalone computing system that is designed to perform the calculations described herein.

The processor 1305 can be in electrical communication with and used to control any of the device components described herein. For example, the processor can be used to execute the conversion application 1330, control the sensor(s) 1340, etc. The processor 1305 can be any type of computer processor known in the art, and can include a plurality of processors and/or a plurality of processing cores. The processor 1305 can include a controller, a microcontroller, an audio processor, a graphics processing unit, a hardware accelerator, a digital signal processor, etc. Additionally, the processor 1305 may be implemented as a complex instruction set computer processor, a reduced instruction set computer processor, an x86 instruction set computer processor, etc. The processor 1305 is used to run the operating system 1310, which can be any type of operating system.

The operating system 1310 is stored in the memory 1315, which is also used to store programs, received measurements/data from the sensor(s) 1340, materials constants and properties (i.e., inputs), mathematical constants and algorithms, network and communications data, peripheral component data, the conversion application 1330, and other operating instructions. The memory 1315 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 1315 can be in the cloud to provide cloud storage for the system. Similarly, in one embodiment, any of the computing components described herein (e.g., the processor 1305, etc.) can be implemented in the cloud such that the system can be run and controlled through cloud computing.

The I/O system 1320 is the framework which enables users and peripheral devices to interact with the computing device 1302. The I/O system 420 can also include one or more speakers, one or more displays, one or more microphones, a keyboard, a mouse, one or more buttons or other controls, etc. that allow the user to interact with and control the computing device 1302. The I/O system 1320 also includes circuitry and a bus structure to interface with peripheral computing devices such as the imaging sensor, power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc.

The network interface 1325 includes transceiver circuitry (e.g., a transmitter and a receiver) that allows the computing device 1302 to transmit and receive data to/from other devices such as the sensor(s) 1340, remote computing systems, servers, websites, etc. The network interface 1325 enables communication through the network 1335, which can be one or more communication networks. The network 1335 can include a cable network, a fiber network, a cellular network, a wi-fi network, a landline telephone network, a microwave network, a satellite network, etc. The network interface 1325 also includes circuitry to allow device-to-device communication such as Bluetooth® communication.

The conversion application 1330 can include software and algorithms in the form of computer-readable instructions which, upon execution by the processor 1305, performs any of the various operations described herein such as receiving information from the sensor(s) 1340, calibrating the sensor(s) 1340, solving equations, determining field values, making conversions, outputting results in the form of sensed values and calculated field values that are based on the sensed values, etc. The conversion application 1330 can utilize the processor 1305 and/or the memory 1315 as discussed above. In an alternative implementation, the conversion application 1330 can be remote or independent from the computing device 1302, but in communication therewith.

The sensor(s) 1340 can include a temperature sensor (e.g., thermal couple, infrared detector, etc.), a displacement sensor (e.g., optical position detector, accelerometer, position sensor, eddy current sensor, capacitance sensor, etc.), an electrical field strength sensor, an electrical current sensor, a voltage sensor, a magnetic field strength sensor, etc. In the tool/surface embodiment, the sensor(s) can be positioned on either tool or the workpiece, depending on the implementation. In addition to use monitoring a tool/surface interface, the proposed system can also be used in monitoring tools in die-less metal forming, monitoring cam-follower set in engines, pumps, compressors, etc. (for both cam and follower), monitoring railway rails and train wheels, monitoring rolling elements and races of rolling bearings, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A machining tool system comprising:
   a sensor mounted on a tool tip of the machining tool such that the sensor is adjacent to or in contact with a surface that is subjected to a load by the tool tip, wherein the sensor is configured to detect a first field value related to a condition of the surface, wherein the first field value results from the load caused by the tool tip;
   a memory configured to store information regarding the surface; and
   a processor coupled to the memory and in communication with the sensor, wherein the processor is configured to monitor the condition of the surface while the surface is subjected to the load by the tool tip, wherein the processor monitors the condition of the surface through determination of a second field value based on the detected first field value and the information regarding the surface, wherein the second field value also results from the load caused by the tool tip.

2. The system of claim 1, wherein the sensor comprises a thermal couple or infrared detector such that the first field value comprises a temperature of the surface.

3. The system of claim 2, wherein the second field value comprises electric field potential of the surface or magnetic field potential of the surface, and wherein the processor determines the electric field potential of the surface or magnetic field potential based at least in part on the temperature.

4. The system of claim 2, wherein the second field value comprises an amount of displacement of the surface, and wherein the processor determines the amount of displacement of the surface based at least in part on the temperature.

5. The system of claim 2, wherein the second field value comprises diffused mass density of the surface, and wherein the processor determines the diffused mass density of the surface based at least in part on the temperature.

6. The system of claim 1, wherein the information regarding the surface includes one or more of an elastic modulus of the surface, thermal conductivity of the surface, dielectric permittivity of the surface, magnetic permeability of the surface, and chemical diffusivity of the surface.

7. The system of claim 1, wherein the sensor comprises a first sensor in the form of a temperature sensor, and further comprising a second sensor in the form of a displacement sensor, and wherein the processor uses measurements from the displacement sensor to adjust a heat-flux coefficient of the surface.

8. The system of claim 7, wherein the processor determines the second field value based in part on the adjusted heat-flux coefficient.

9. The system of claim 1, wherein the sensor comprises a first sensor and the first field comprises any of a mechanical field, a thermal field, an electromagnetic field, or a chemical field, and further comprising a second sensor configured to detect a second field related to the surface, wherein the second field is different from the first field and comprises one or more of the mechanical field, the thermal field, the electromagnetic field, and the chemical field.

10. The system of claim 1, wherein the sensor is located at a distance X from a center of the load that is applied to the surface.

11. The system of claim 10, wherein the distance X is less than or equal to ten times a radius of load distribution of the load applied to the surface.

12. The system of claim 1, wherein the processor determines a shape of a load distribution of the load, and wherein the processor determines a shape of a heat flux of the surface.

13. The system of claim 12, wherein the processor compares the shape of the load distribution of the load to the shape of the heat flux, and wherein, responsive to a determination that the shape of the load distribution and the shape of the heat flux are the same, the processor adjusts a heat-flux coefficient for the surface.

14. The system of claim 1, wherein the sensor is located at a first location on the surface, and wherein the processor determines one or more field values at a second location on the surface based on a symmetry of the load.

15. A method of performing multifield, multifunctional sensing for a machining tool, the method comprising:
   sensing, by a sensor mounted on a tool tip of the machining tool such that the sensor is adjacent to or in contact with a surface that is subjected to a load by the tool tip, a first field value related to the surface;
   storing, in a memory, information regarding the surface; and
   monitoring, by a processor coupled to the memory and in communication with the sensor, the condition of the surface while the surface is subjected to the load by the tool tip, wherein the processor monitors the condition of the surface by determining a second field value based on the detected first field value and the information regarding the surface, wherein the second field value also results from the load caused by the tool tip.

16. The method of claim 15, wherein the sensor comprises a first sensor in the form of a temperature sensor, and further comprising sensing, by a second sensor in the form of a displacement sensor, a displacement of the surface in response to the load.

17. The method of claim 16, further comprising adjusting, by the processor a heat-flux coefficient of the surface based at least in part on the sensed displacement of the surface.

18. The method of claim 17, wherein the processor determines the second field value based in part on the adjusted heat-flux coefficient.

19. The method of claim 15, wherein the sensor comprises a temperature sensor that detects a temperature of the surface, wherein the second field value comprises electric field potential of the surface, magnetic field potential of the surface, an amount of displacement of the surface, or a diffused mass density of the surface, and wherein the processor determines the second field value based at least in part on the temperature.

20. The method of claim 15, wherein the sensor is located at a first location on the surface, and further comprising determining, by the processor, one or more field values at a second location on the surface based on a symmetry of the load.

* * * * *